(12) United States Patent
Matsuda et al.

(10) Patent No.: US 9,921,874 B2
(45) Date of Patent: Mar. 20, 2018

(54) STORAGE MEDIUM, INFORMATION PROCESSING DEVICE, AND INFORMATION PROCESSING METHOD

(71) Applicant: FUJITSU LIMITED, Kawasaki-shi, Kanagawa (JP)

(72) Inventors: Yuichi Matsuda, Yokohama (JP); Haruyasu Ueda, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 524 days.

(21) Appl. No.: 13/900,901

(22) Filed: May 23, 2013

(65) Prior Publication Data

US 2013/0326535 A1    Dec. 5, 2013

(30) Foreign Application Priority Data

Jun. 5, 2012 (JP) ................. 2012-128455

(51) Int. Cl.
*G06F 9/46* (2006.01)
*G06F 9/50* (2006.01)

(52) U.S. Cl.
CPC ............. *G06F 9/50* (2013.01); *G06F 9/505* (2013.01); *G06F 2209/5017* (2013.01)

(58) Field of Classification Search
None
See application file for complete search history.

(56) References Cited

U.S. PATENT DOCUMENTS

| | | |
|---|---|---|
| 2007/0038659 A1 | 2/2007 | Datar et al. |
| 2010/0115046 A1* | 5/2010 | Reddy Byreddy .... G06Q 10/06 709/208 |
| 2012/0182891 A1* | 7/2012 | Lee .......... H04L 43/04 370/252 |
| 2012/0197596 A1* | 8/2012 | Comi .................... G06F 9/5066 702/188 |
| 2013/0104140 A1* | 4/2013 | Meng ................... G06F 9/5066 718/104 |
| 2013/0167151 A1* | 6/2013 | Verma .................. G06F 9/5066 718/102 |
| 2013/0290976 A1* | 10/2013 | Cherkasova .......... G06F 9/5038 718/104 |

FOREIGN PATENT DOCUMENTS

JP    2009-505290    2/2009

* cited by examiner

*Primary Examiner* — Sisley Kim
(74) *Attorney, Agent, or Firm* — Oblon, McClelland, Maier & Neustadt, L.L.P.

(57) ABSTRACT

A non-transitory computer-readable recording medium storing a program causing a processor to execute a process, the process includes detecting input of data into a memory to which data is inputted in sequence, the data being a processing object of first processing; allocating the first processing, of which a processing object is the data, with respect to any node in a communicable node group; determining whether or not the data is provided with tail information, the tail information indicating tail data of a series of data that are processing objects of the first processing, when detecting input of the data; and allocating second processing, of which a processing object is a processing result of the first processing that is executed with respect to each piece of data of the series of data, to any node of the node group when determining that the data is provided with the tail information.

11 Claims, 25 Drawing Sheets

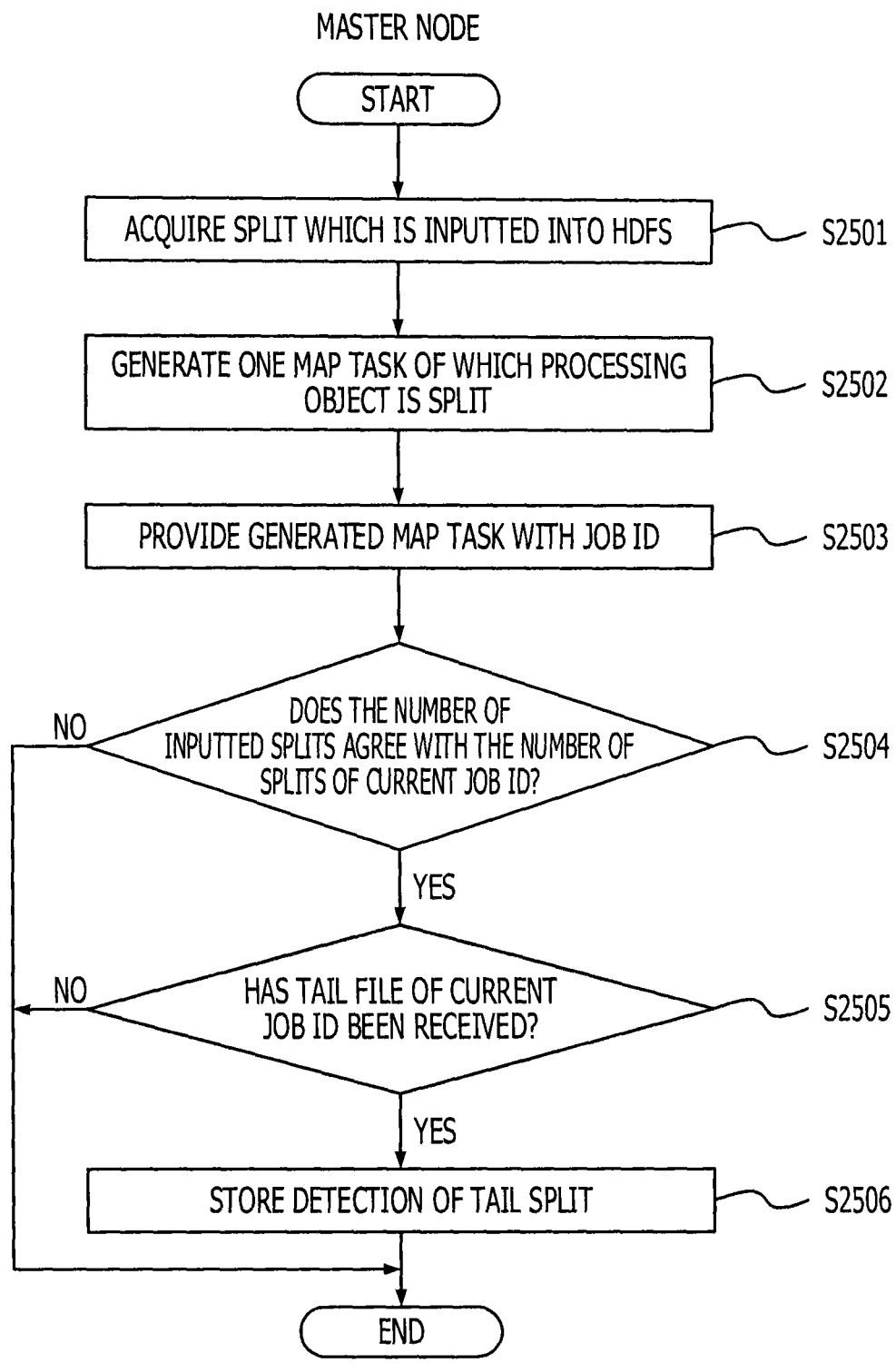

US 9,921,874 B2

STORAGE MEDIUM, INFORMATION PROCESSING DEVICE, AND INFORMATION PROCESSING METHOD

CROSS-REFERENCE TO RELATED APPLICATION

This application is based upon and claims the benefit of priority of the prior Japanese Patent Application No. 2012-128455, filed on Jun. 5, 2012, the entire contents of which are incorporated herein by reference.

FIELD

The embodiments discussed herein are related to a storage medium, an information processing device, and an information processing method.

BACKGROUND

Map-reduce which is a distributed processing technique has been used in recent years as a technique for processing large amount of data. Map-reduce is a distributed processing technique in which processing of data is performed separately in two stages which are map processing and reduce processing. In map-reduce, data accumulated in a database at predetermined intervals is divided into a plurality of pieces of data. Further, each of a plurality of nodes executes map processing in which certain processing is performed with respect to the divided data. Then, at least any node among a plurality of nodes executes reduce processing for acquiring a processing result of the whole data, with respect to a processing result of the map processing.

As a related technique, a technique which applies map-reduce to information, in which a set of interests of each of a plurality of users is stored, so as to enable clustering of the users has been disclosed.

As related art, Japanese National Publication of International Patent Application No. 2009-505290 has been disclosed, for example.

SUMMARY

According to an aspect of the invention, a non-transitory computer-readable recording medium storing a program causing a processor to execute a process, the process includes detecting input of data into a memory to which data is inputted in sequence, the data being a processing object of first processing; allocating the first processing, of which a processing object is the data, with respect to any node in a communicable node group when detecting input of the data; determining whether or not the data is provided with tail information, the tail information indicating tail data of a series of data that are processing objects of the first processing, when detecting input of the data; and allocating second processing, of which a processing object is a processing result of the first processing that is executed with respect to each piece of data of the series of data, to any node of the node group when determining that the data is provided with the tail information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 25 is a flowchart illustrating an example of a map task generation processing procedure according to embodiment 2.

DESCRIPTION OF EMBODIMENTS

In the related technique, map processing is performed at once with respect to all pieces of data which are processing objects. Therefore, execution of the map processing is started after all pieces of data which are processing objects gather and accordingly, the start of execution of the map processing is delayed. Further, if the map processing is performed at once with respect to all pieces of data which are processing objects, execution time slots of the map processing with respect to respective nodes are concentrated to cause delay of the map processing.

A storage medium, an information processing device, and an information processing method according to embodiments of the present disclosure are described below in detail with reference to the accompanying drawings. As an example of an information processing device according to embodiment 1, a master node which allocates processing with respect to slave nodes in a distributed processing system is described.

Embodiment 1

Figure 1:
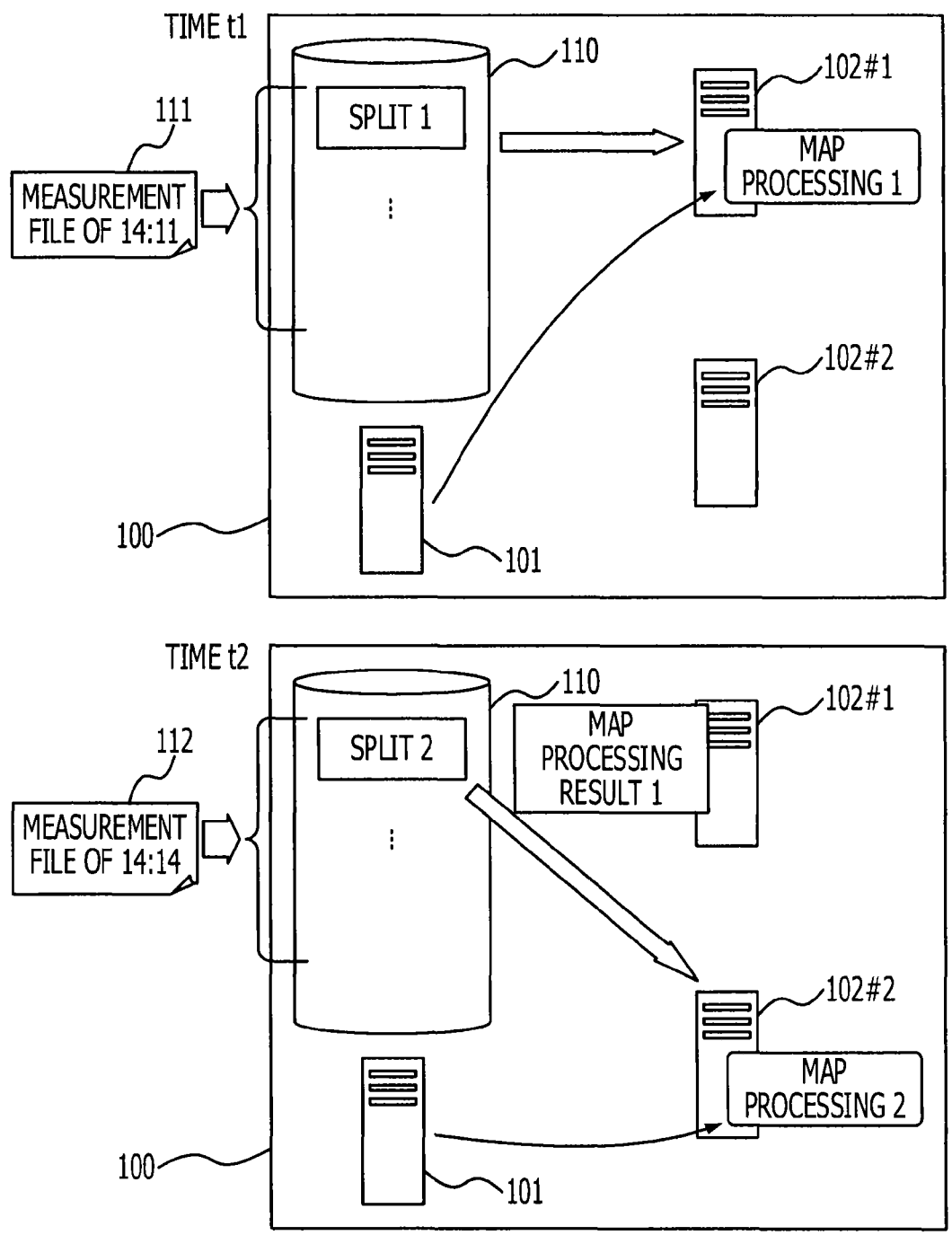
FIG. 1 is an explanatory diagram (I) illustrating an operation example of a distributed processing system according to embodiment 1.
Figure 2:
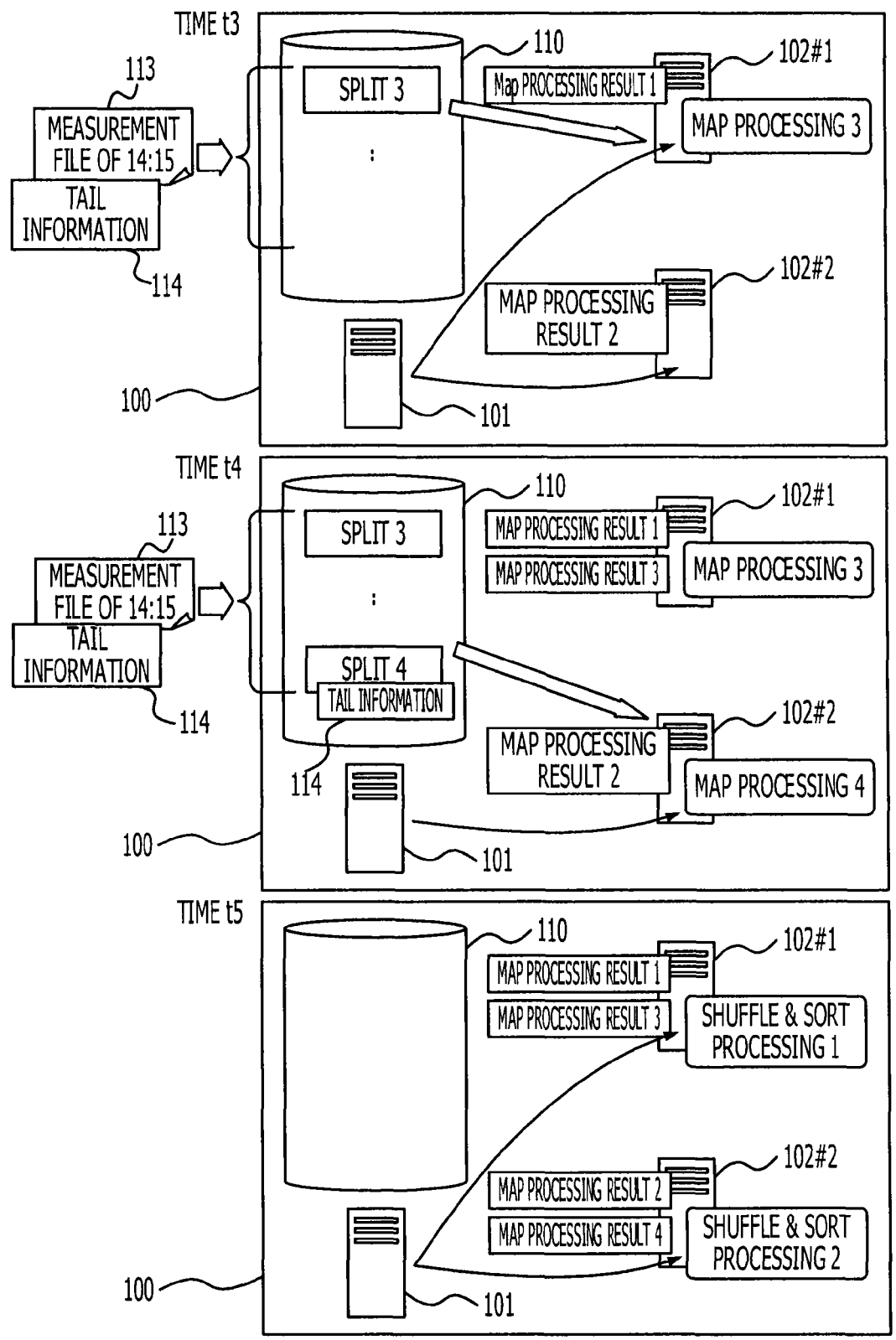
FIG. 2 is an explanatory diagram (II) illustrating an operation example of the distributed processing system according to embodiment 1.

FIGS. 1 and 2 are explanation drawings (I) and (II) which illustrate an operation example of a distributed processing system according to embodiment 1. A distributed processing system 100 includes a master node 101 which allocates first processing and second processing, slave nodes 102 to which the first processing and the second processing are allocated, and a database 110. n pieces of slave nodes 102 may be provided in the distributed processing system 100. n is an integer of 1 or more. In the example of FIG. 1, the distributed processing system 100 includes a slave node 102#1 and a slave node 102#2. In the description below, x is an index and a reference character provided with a tail symbol "#x" indicates the x-th slave node 102. x is an integer from 1 to n. An expression of the slave node 102 indicates description common in all slave nodes 102.

The first processing which is allocated to the slave node 102 is independent from first processing which is allocated to other slave nodes 102 and first processing which is respectively allocated to slave nodes 102 may be executed in parallel. For example, first processing is processing for outputting data in a format of key-value, by using data inputted into the database 110, independently from first processing with respect to other pieces of inputted data. The data in the format of key-value is a combination of an arbitrary value which is stored in a value field and is to be maintained and a unique indicator corresponding to data which is stored in a key field and is to be maintained.

The second processing is processing with respect to one or more processing results which are obtained by summarizing a processing result of the first processing on the basis of an attribute of the processing result of the first processing. For example, when a processing result of the first processing is data of the key-value format, second processing is processing with respect to one or more processing results which are obtained by summarizing a first processing result on the basis of a key field which is an attribute of the processing result of the first processing. For example, the second processing may be processing with respect to one or more processing results which are obtained by summarizing the first processing result on the basis of a value field.

The database 110 is a storage region which is accessible by a device in the distributed processing system 100. Into the database 110, data which is a processing object of the first processing is sequentially inputted.

Any data may be used as data. For example, a series of data is a file in which a measurement result in a certain period of time is recorded. Any data of a series of data is a split obtained by dividing a file in logical separation, for example. Logical separation is a row unit of a file, for example.

The measurement result of a certain time slot is a measurement result of an amount of traffic for each road for every minute. Alternatively, the measurement result of a certain time slot may be a measurement result of temperature or humidity of every minute in a certain room. The distributed processing system 100 refers to a series of data and executes the first processing and the second processing so as to output a processing result. For example, the distributed processing system 100 counts the number of vehicles of each road by using measurement results of an amount of traffic of each road per minute for five minutes and outputs the number as congestion information.

A description is provided on an assumption that the distributed processing system 100 outputs congestion information by using a measurement file group in a state that splits, which are obtained by dividing measurement files 111 to 113 for five minutes from 14:11 to 14:15, are inputted in sequence. It is assumed that the measurement file 113 is provided with tail information 114 indicating a last file of processing objects of congestion information. Further, the distributed processing system 100 executes processing of calculating congestion information in a distributed manner to the slave node 102#1 and the slave node 102#2. An example that the distributed processing system 100 according to embodiment 1 employs Hadoop as software for distributed-processing is described.

The distributed processing system 100 according to embodiment 1 is described by using terms which are used in Hadoop. "Job" is a processing unit in Hadoop. For example, processing for calculating congestion information is one job. "Task" is a processing unit obtained by dividing a job. As a task, there are two kinds of tasks which are a map task for executing map processing which is the first processing and a reduce task for executing reduce processing which is the second processing. Regarding the reduce task, shuffle and sort processing for summarizing a processing result of map processing on the basis of a key field is executed before reduce processing so as to facilitate execution of the reduce processing.

FIG. 1 illustrates a state of the distributed processing system 100 at time t1 and a state at time t2. FIG. 2 illustrates a state of the distributed processing system 100 at time t3, a state at time t4, and a state at time t5. It is assumed that time elapses in an order of time t1, time t2, time t3, time t4, and time t5.

At time t1 depicted in FIG. 1, the master node 101 receives an execution request of a job for calculating congestion information. At time t1 depicted in FIG. 1, the master node 101 detects that a split 1 of the measurement file 111 of 14:11 has been inputted into the database 110. When detecting that the split 1 has been inputted, the master node 101 allocates map processing 1 for a divided job of which a processing object is the split 1, to the slave node 102#1.

In this case, if execution of the map processing with respect to part of splits is started before all splits which are processing objects gather, map-reduce processing may be executed in a manner that the part of splits is considered as processing objects of the whole job and therefore, an expected processing result may not be obtained. For an accurate processing result, the master node 101 determines whether or not the split 1 is provided with tail information indicating a tail split of a measurement file group which is processed as an identical job. Since the split 1 is not provided with tail information, the master node 101 determines that splits are to be continuously inputted.

At time t2 depicted in FIG. 1, the master node 101 detects that a split 2 of the measurement file 112 of 14:14 has been inputted into the database 110. When detecting that the split 2 has been inputted, the master node 101 allocates map processing 2 of which a processing object is the split 2, to the slave node 102#2. The slave node 102#1 has completed the map processing 1 at time t2 depicted in FIG. 1 and maintains a map processing result 1. The master node 101 determines whether or not the split 2 is provided with tail information. Since the split 2 is not provided with tail information, the master node 101 determines that splits are to be further continuously inputted.

At time t3 depicted in FIG. 2, the master node 101 detects that a split 3 of the measurement file 113 of 14:15 has been inputted into the database 110. When detecting that the split 3 has been inputted, the master node 101 allocates map processing 3 of which a processing object is the split 3, to the slave node 102#1. The slave node 102#2 has completed the map processing 2 at time t3 depicted in FIG. 2 and maintains a map processing result 2. The master node 101 determines whether or not the split 3 is provided with tail information. Since the split 3 is not provided with tail information, the master node 101 determines that splits are to be further continuously inputted.

At time t4 depicted in FIG. 2, the master node 101 detects that a split 4 of the measurement file 113 of 14:15 has been inputted into the database 110. It is assumed that the split 4 is the tail end of the measurement file 113. A device which inputs the split 4 into the database 110 inputs the split 4 after completion of the input of the split 3. Since the split 4 is the tail end of the measurement file 113, the split 4 is provided with the tail information 114. When detecting that the split 4 has been inputted, the master node 101 allocates map processing 4 of which a processing object is the split 4, to the slave node 102#2. The slave node 102#1 has completed the map processing 3 at time t4 depicted in FIG. 2 and maintains the map processing result 3.

The master node 101 determines whether or not the split 4 is provided with the tail information 114. The split 4 is provided with the tail information 114. Therefore, the master node 101 determines that input of splits is ended. An operation of a case where it is determined that a split is provided with the tail information 114 is described in reference to time t5 depicted FIG. 2.

At time t5 depicted in FIG. 2, the master node 101 allocates shuffle and sort processing 1 and 2 in which the map processing results 1 to 4 are summarized on the basis of attributes of the map processing results, to the slave nodes 102#1 and 102#2 respectively. The map processing result 1 and the map processing result 3 are processing objects of the shuffle and sort processing 1. The map processing result 2 and the map processing result 4 are processing objects of the shuffle and sort processing 2. Though it is not depicted in FIG. 2, the slave node 102#1 executes reduce processing 1 with respect to a processing result of the shuffle and sort processing 1. The slave node 102#2 executes reduce processing 2 with respect to a processing result of the shuffle and sort processing 2.

Thus, the distributed processing system 100 sequentially executes map processing with respect to data which is inputted into the database 110 in sequence. Then, the distributed processing system 100 shifts the processing to the shuffle and sort processing after completion of the map processing of data which is provided with tail information. By sequentially executing the map processing with respect to data and waiting for execution of the shuffle and sort processing until data which is provided with tail information is inputted, the distributed processing system 100 is capable of avoiding concentration of time slots for execution of the map processing of identical jobs and efficiently executing distributed processing. The distributed processing system 100 is now described with reference to FIGS. 3 to 20.

Figure 3:
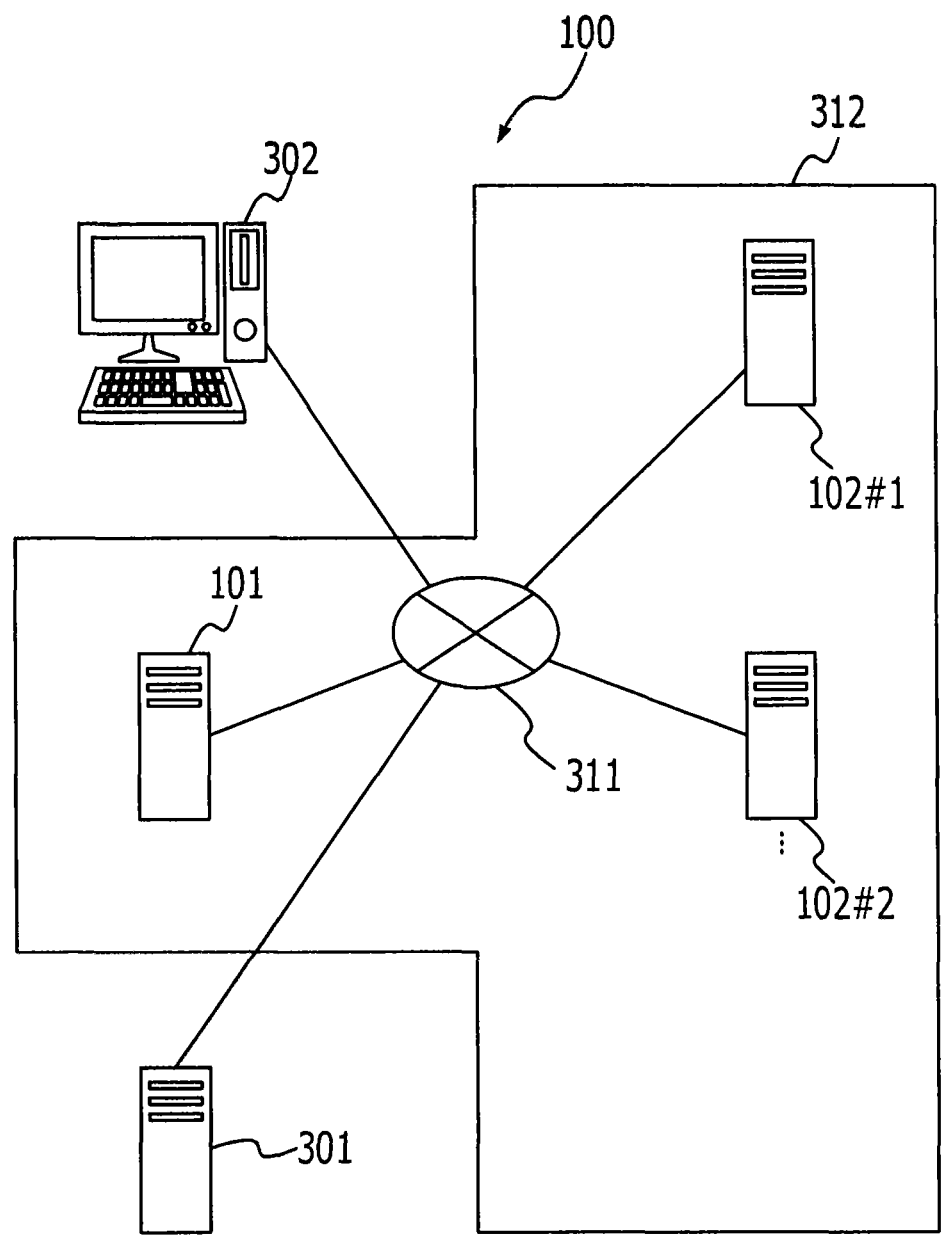
FIG. 3 illustrates an example of the system configuration of the distributed processing system.

FIG. 3 illustrates a system configuration example of a distributed processing system. The distributed processing system 100 includes the master node 101, slave nodes 102#1 to 102#n, a job client 301, and a Hadoop distributed file system (HDFS) client 302. The master node 101, the slave nodes 102#1 to 102#n, the job client 301, and the HDFS client 302 are coupled with each other via a network 311. The master node 101 and the slave nodes 102#1 to 102#n are collectively defined as a Hadoop cluster 312. The Hadoop cluster 312 may include the job client 301 and the HDFS client 302.

The master node 101 is a device for allocating map processing and reduce processing to the slave node 102#1 to the slave node 102#n. The slave node 102#1 to the slave node 102#n are devices which execute map processing and reduce processing which are allocated.

The job client 301 stores a measurement file which is inputted into the database 110, a program which is an executable file, and a setting file of an execution file. The job client 301 is a device which notifies the master node 101 of a job execution request.

A measurement file may be transmitted from a device which is included in a system other than the distributed processing system 100 which generates the measurement file, to the job client 301. A measurement file may be stored in the job client 301 by an operator or the like of the distributed processing system 100. A device which divides a measurement file into splits may be the job client 301 or the master node 101. The job client 301 provides tail information to a measurement file. For example, the job client 301 registers a job for calculating congestion information using measurement files from 14:11 to 14:15, and when acquiring the measurement file 113 of 14:15, the job client 301 provides tail information to the tail end of the measurement file 113 of 14:15.

The HDFS client 302 is a terminal which performs a file operation of a HDFS which is a file system dedicated to Hadoop. The network 311 is a local area network (LAN), a wide area network (WAN), or Internet, for example.

Figure 4:
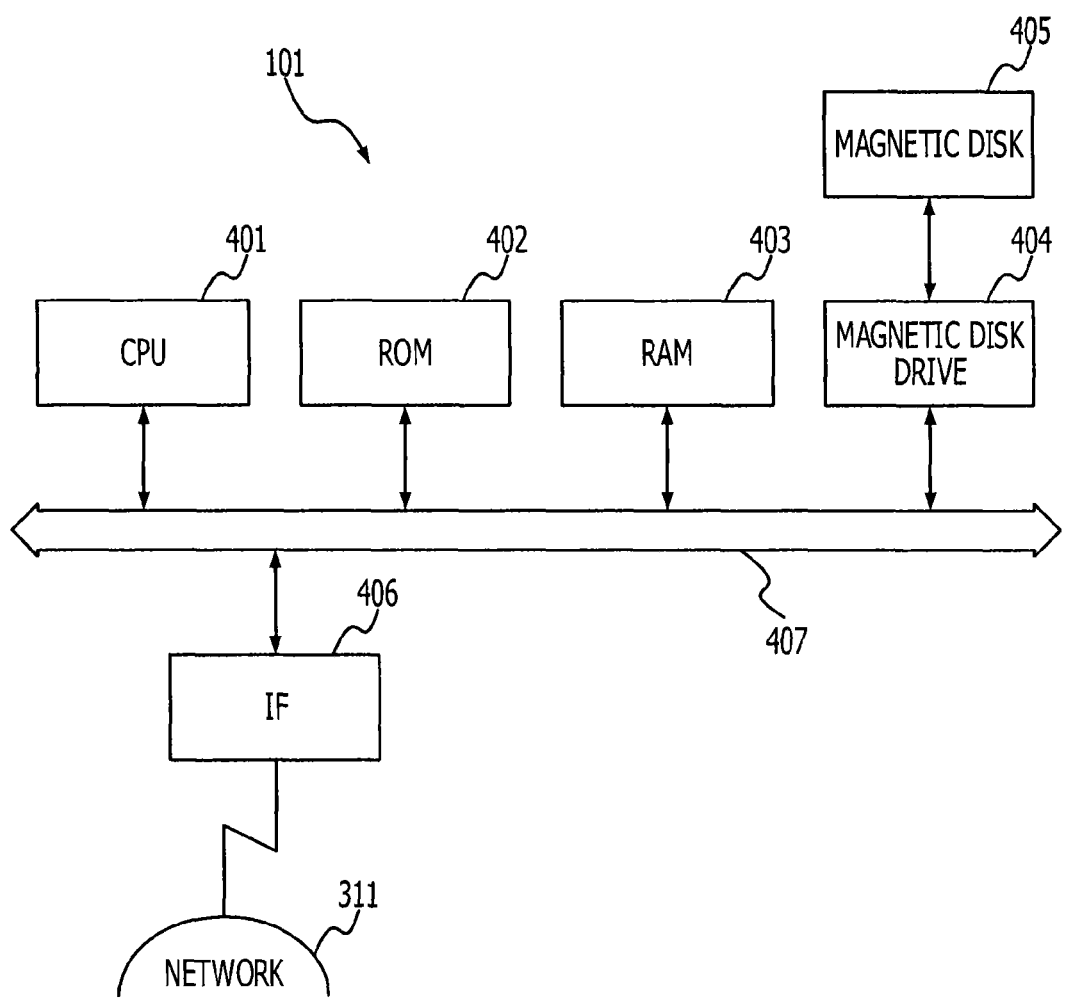
FIG. 4 is a block diagram illustrating an example of the hardware configuration of a master node.

FIG. 4 is a block diagram illustrating a hardware configuration example of a master node. In FIG. 4, the master node 101 includes a central processing unit (CPU) 401, a read-only memory (ROM) 402, and a random access memory (RAM) 403. The master node 101 further includes a magnetic disk drive 404, a magnetic disk 405, and an interface (IF) 406. Respective elements are coupled with each other by a bus 407.

The CPU 401 is an arithmetic processing device which controls the whole of the master node 101. The ROM 402 is a non-volatile memory which stores a program such as a boot program. The RAM 403 is a volatile memory which is used as a work area of the CPU 401. The magnetic disk drive 404 is a control device which controls reading/writing of data with respect to the magnetic disk 405 in accordance with the control of the CPU 401. The magnetic disk 405 is a non-volatile memory which stores data which is written in accordance with the control of the magnetic disk drive 404. An allocation program according to embodiment 1 may be stored in either storage device between the ROM 402 and the magnetic disk 405.

The IF 406 is coupled with other devices via the network 311 through a communication line. Further, the IF 406 serves as an interface between the network 311 and the inside and controls input/output of data from external devices. As the IF 406, a modem or a LAN adapter may be employed, for example.

When an operator of the master node 101 directly operates the master node 101, the master node 101 may include an optical disk drive, an optical disk, a display, and a mouse.

The optical disk drive is a control device which controls reading/writing of data with respect to an optical disk in accordance with control of the CPU 401. The optical disk stores data which is written in accordance with control of the optical disk drive. The optical disk permits a computer to read data which is stored in the optical disk.

The display displays a cursor, an icon, or a tool box. The display displays data such as a document, an image, and function information. The display is a CRT, a TFT liquid crystal display, a plasma display, or the like, for example.

The keyboard includes keys for inputting characters, digits, various instructions, and the like, and inputs data. The keyboard may be a touch-panel type input pad, a numerical keypad, or the like. The mouse performs movement of a cursor, range selection, movement of a window, or change of the size of a window. The master node 101 may include a trackball, a joy stick, or the like instead of a mouse as long as the trackball, the joy stick, or the like has a similar function as a pointing device.

The slave node 102#1, the slave node 102#2, and the job client 301 include a CPU, a ROM, a RAM, a magnetic disk drive, and a magnetic disk. The HDFS client 302 includes a CPU, a ROM, a RAM, a magnetic disk drive, a magnetic disk, an optical disk drive, an optical disk, a display, and a mouse.

Figure 5:
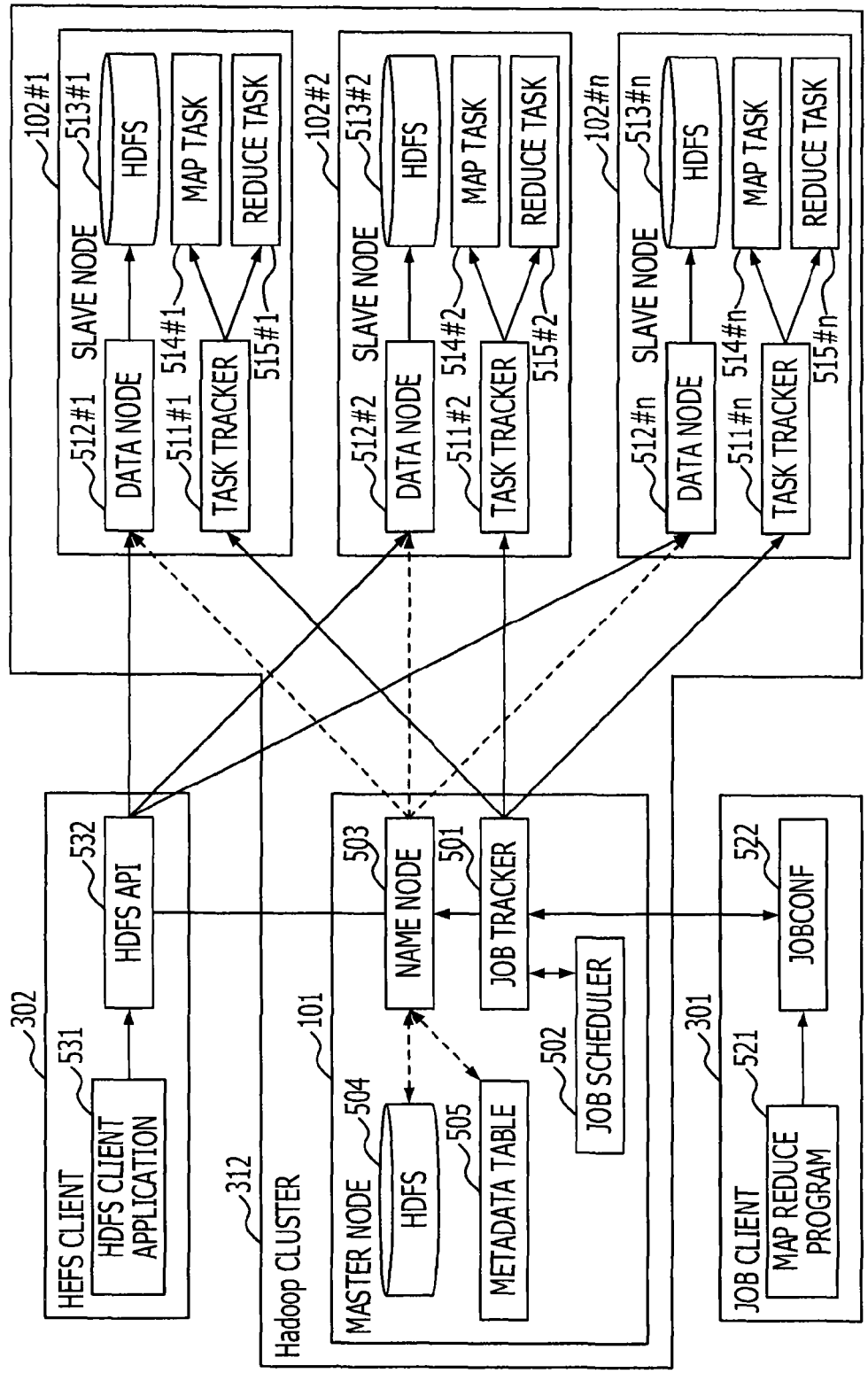
FIG. 5 illustrates an example of the software configuration of the distributed processing system.

FIG. 5 illustrates an example of the software configuration of a distributed processing system. The master node 101 includes a job tracker 501, a job scheduler 502, a name node 503, a HDFS 504, and a metadata table 505. A slave node 102#x includes a task tracker 511#x, a data node 512#x, a HDFS 513#x, a map task 514#x, and a reduce task 515#x. x is an integer from 1 to n. The job client 301 includes a map-reduce program 521, and a job-conf 522. The HDFS client 302 includes a HDFS client application 531 and a HDFS application programming interface (API) 532.

The database 110 depicted in FIG. 1 includes the HDFS 504 and the HDFSs 513#1 to 513#n. Hadoop may be a file system other than the HDFS. For example, the distributed processing system 100 may employ a file server which is accessible by the master node 101 and the slave nodes 102#1 to 102#n by file transfer protocol (FTP), as the database 110.

The job tracker 501 receives a job which is to be executed, from the job client 301. Subsequently, the job tracker 501 allocates a map task 514, a reduce task 515 to the task tracker 511 which is available in a cluster. The job scheduler 502 decides a job which is subsequently executed. Specifically, the job scheduler 502 decides a job which is next executed among a plurality of jobs which are requested by the job client 301. The job scheduler 502 generates a map task 514 with respect to the decided job every time a split is inputted.

The name node 503 controls a storage destination of a file in the Hadoop cluster 312. For example, the name node 503 decides where a file inputted into the database 110 is stored, among the HDFS 504 and the HDFSs 513#1 to 513#n. Then, the name node 503 transmits the file to the decided HDFS.

The HDFS 504 and the HDFSs 513#1 to 513#n are storage regions in which a file is stored in a distributed manner. Concretely, the HDFSs 513#1 to 513#n store a file in a block unit obtained by dividing the file at physical separations. The metadata table 505 is a storage region in which positions of files which are stored in the HDFS 504 and the HDFSs 513#1 to 513#n are stored. A specific storage method of a file by using the metadata table 505 will be described later with reference to FIGS. 6A to 6C. A relation between a block and a split will be described later in reference to FIG. 7.

The task tracker 511 allows the slave node 102 to execute the map task 514 and the reduce task 515 which are allocated by the job tracker 501. The task tracker 511 notifies the job tracker 501 of progress of the map task 514 and the reduce task 515 and completion report of processing.

The data node 512 controls the HDFS 513 in the slave node 102. The map task 514 executes map processing. The reduce task 515 executes reduce processing. The reduce task 515 executes shuffle and sort processing as a previous stage of the execution of the reduce processing. The shuffle and sort processing is processing for summarizing results of the map processing. Specifically, in the shuffle and sort processing, results of the map processing are sorted for every key and values of identical keys are integrally outputted to the reduce processing.

The map-reduce program 521 includes a program for executing the map processing and a program for executing the reduce program. The job-conf 522 is a program in which setting of the map-reduce program 521 is described. Examples of the setting include the generation number of map tasks 514, the generation number of reduce tasks 515, an output destination of a processing result of the map-reduce processing, and the like.

The HDFS client application 531 is an application for operating a HDFS. The HDFS API 532 is an API for accessing a HDFS. When access of a file is requested from the HDFS client application 531, for example, the HDFS API 532 inquires whether or not the data node 512 maintains the file.

Figure 6A:
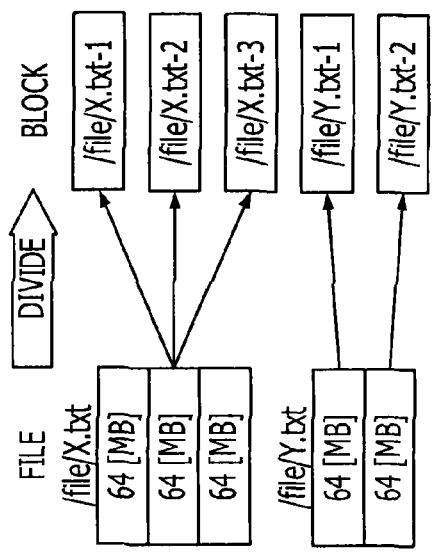
FIGS. 6A to 6C illustrate an example of a method for storing a file by a HDFS.
Figure 6B:
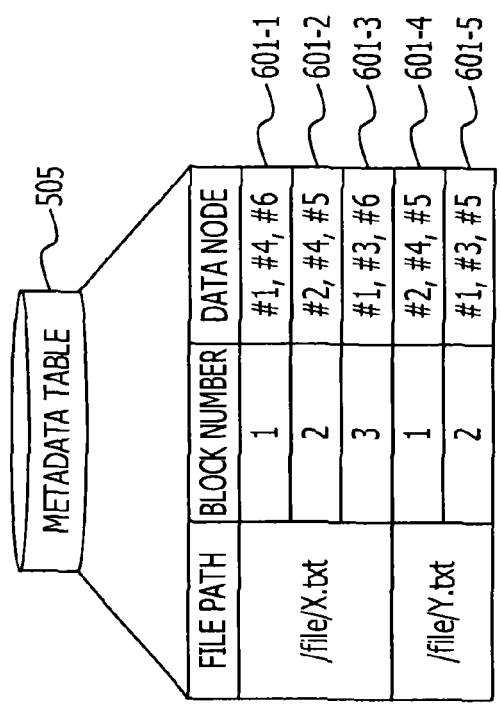
Figure 6C:
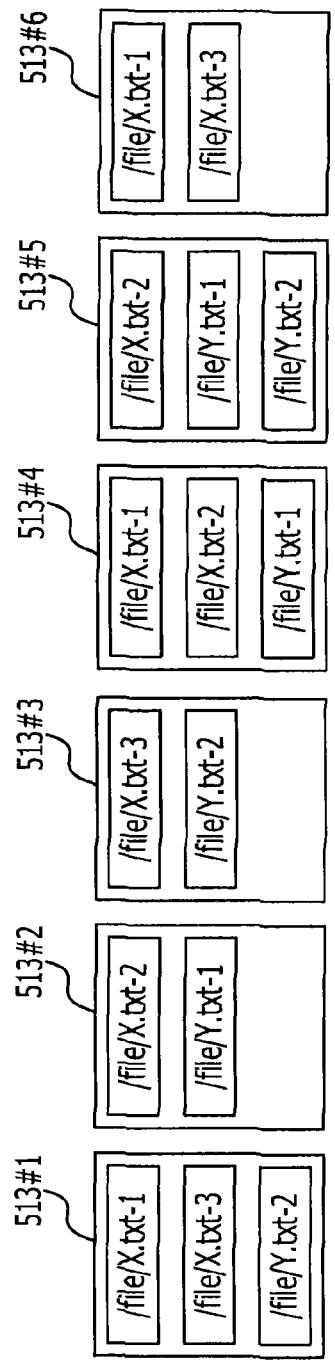

FIGS. 6A to 6C illustrate an example of a storage method of a file by a HDFS. FIG. 6A illustrates an example of a storage content of the metadata table 505. FIG. 6B illustrates a dividing method of a file. FIG. 6C illustrates an example of a storage content of the HDFS 513 according to the storage content of the metadata table 505.

The metadata table 505 depicted in FIG. 6A stores records 601-1 to 601-5. The metadata table 505 includes three fields which are a file path, a block number, and a data node. In the file path field, a character string indicating a position of a file from a route path is stored. In the block number field, an ID of a block in physical division of a file is stored. In the data node field, an ID of a data node in which a block indicated by a corresponding block ID is stored is stored. It is assumed that indexes of the HDFS 513 are stored in the data node field depicted in FIGS. 6A to 6C.

For example, the record 601-1 indicates that the block number 1 of a file path "/file/X.txt" is stored in the HDFSs 513#1, 513#4, and 513#6. Thus, the HDFS divides one file into blocks and stores the blocks in a plurality of HDFSs 513. Blocks obtained by division are stored in storage destinations in a manner to be arranged in different combinations among the blocks. For example, the block number 1 of the file path "/file/X.txt" is stored in the HDFSs 513#1, 513#4, and 513#6. The block number 2 of the file path "/file/X.txt" is stored in the HDFSs 513#2, 513#4, and 513#5.

FIG. 6B illustrates a dividing method of a file. FIG. 6B illustrates a dividing method of the file path "/file/X.txt" and a file path "/file/Y.txt". For example, when a file indicated by the file path "/file/X.txt" is inputted, the name node 503 divides the file into blocks of 64 MB. The name node 503 sets a name of the first block as "/file/X.txt-1". In a similar manner, the name node 503 sets a name of the second block as "/file/X.txt-2". The name node 503 sets a name of the third block as "/file/X.txt-3".

FIG. 6C illustrates an example of a storage content of the HDFS 513 according to the storage content of the metadata table 505. For example, the HDFS 513#1 stores a block represented by "/file/X.txt-1", a block represented by "/file/X.txt-3", and a block represented by "/file/Y.txt-2".

Figure 7:
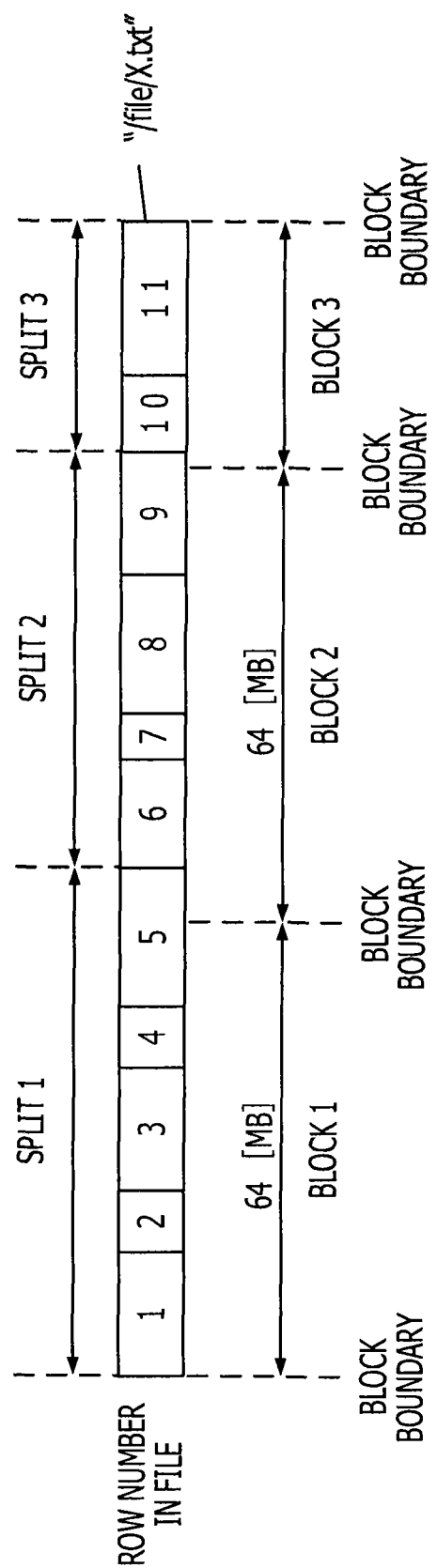
FIG. 7 illustrates a relation between a block and a split.

FIG. 7 illustrates a relation between a block and a split. A block is a physical division unit of a file. A split is a logical division unit of a series of data. FIG. 7 illustrates examples of a block obtained by division and a split obtained by division, by using a file of which a file path is indicated by "/file/X.txt". In division into splits, the name node 503 sets the first to fifth rows of the file indicated by "/file/X.txt" as a split 1, the sixth to ninth rows as a split 2, and the tenth and eleventh rows as a split 3.

The name node 503 sets data of 64 MB from the head as a block 1 in the file indicated by "/file/X.txt". The name node 503 sets data of the next 64 MB as a block 2. The name node 503 sets residual data as a block 3.

Figure 8:
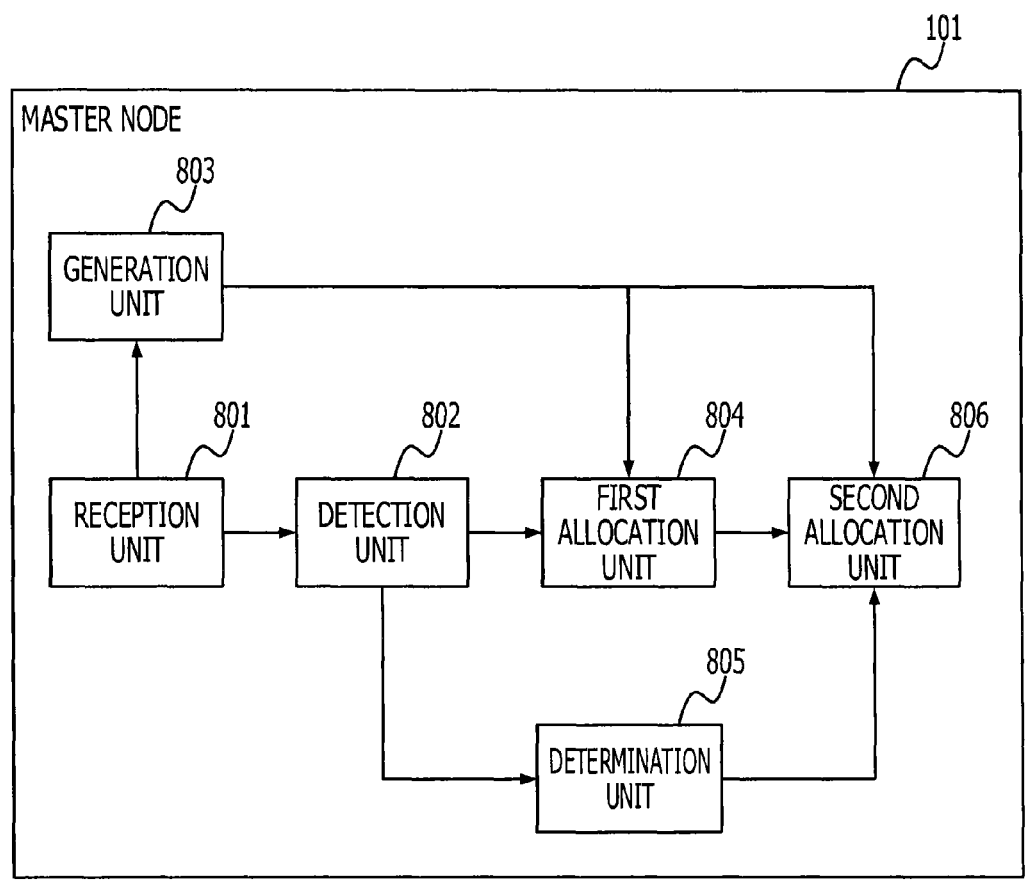
FIG. 8 is a block diagram illustrating an example of the functional configuration of the master node.

The functional configuration of the master node 101 is now described. FIG. 8 is a block diagram illustrating an example of the functional configuration of a master node. The master node 101 includes a reception unit 801, a detection unit 802, a generation unit 803, a first allocation unit 804, a determination unit 805, and a second allocation unit 806. Functions of the reception unit 801, the detection unit 802, the generation unit 803, the first allocation unit 804, the determination unit 805, and the second allocation unit 806 which are control units are realized by execution of a program, which is stored in a storage device, by the CPU 401. Specifically, the storage device is the ROM 402, the RAM 403, and the magnetic disk 405 depicted in FIG. 4, for example. Alternatively, the functions of the reception unit 801, the detection unit 802, the generation unit 803, the first allocation unit 804, the determination unit 805, and the second allocation unit 806 may be realized by execution of a program by another CPU via the IF 406.

The reception unit 801 receives a start request of map processing. In a case of reception of a dummy file from the job client 301, for example, the reception unit 801 receives the dummy file as a start request of the map processing. The dummy file may be a file name which is predetermined by a designer of the distributed processing system 100, or may be a file of empty data, for example. Due to the function of the reception unit 801, the distributed processing system 100 is capable of detecting timing of start of map-reduce processing for sequentially processing files which are inputted in sequence. The received start request is stored in a storage region such as the RAM 403 and the magnetic disk 405.

The detection unit 802 detects input of a new split into the database 110 into which splits which are processing objects of the map processing are inputted in sequence. For example, the detection unit 802 refers to the database 110 at a given cycle and detects input of a split on the basis of a difference from a split list which is stored in a database in the previous input. Alternatively, the detection unit 802 regularly inquires whether a new split has been inputted into the name node 503. When the detection unit 802 receives a reply in which a new split has been inputted, the detection unit 802 may detect the input of a split. The master node 101 may receive a split from the job client 301, or may receive a file and divide the file into splits so as to input the splits into the database 110. When the master node 101 receives a split, the master node 101 inputs the received split into the database 110 in the control of the name node 503.

When a start request has been received by the reception unit 801, the detection unit 802 starts execution of processing for detecting input of a new split into the database 110. For example, when a start request is received, the detection unit 802 starts to refer to the database 110 at a given cycle. Due to the function of the detection unit 802, the distributed processing system 100 is capable of executing the map processing at timing when the split is inputted into the database 110. A detection result is stored in a storage region such as the RAM 403 and the magnetic disk 405.

When a start request has received by the reception unit 801, the generation unit 803 generates identification information which is inherent in a processing object of the map processing. Identification information inherent in a processing object is information by which a processing object is possible to be identified. The generation unit 803 generates identification information "1" with respect to the splits 1, 2, . . . which are processing objects. When a start request is received again after tail information is once received, the generation unit 803 generates identification information "2", for example, as new identification information. Since a start request is notified in a job unit, identification information is identification information of a job. Hereinafter, identification information is referred to as a "job ID". Generated identification information is stored in a storage region such as the RAM 403 and the magnetic disk 405.

When input of a new split has been detected by the detection unit 802, the first allocation unit 804 allocates map processing, of which a processing object is a new split, to any node in a communicable node group. For example, when it is detected that the split 1 has been inputted, the first allocation unit 804 allocates map processing, of which a processing object is the split 1, to the slave node 102#1 among the slave nodes 102#1 to 102#*n*.

The first allocation unit 804 may allocate map processing, of which a processing object is a new split, in addition to a job ID which is generated by the generation unit 803, to any node in a node group in the following condition. The condition is a case where input of a new split has been detected by the detection unit 802. For example, the first allocation unit 804 allocates map processing, of which a processing object is the split 1, in addition to job ID:1, to the slave node 102#1.

When input of a new split has been detected by the detection unit 802, the determination unit 805 determines whether or not the new split is provided with tail information indicating a tail split in a series of splits which are processing objects of the map processing. The series of splits are processing objects which are processed as identical jobs.

Tail information is a value which is discriminable from a content of a split. When a measurement file is text data, for example, tail information may be a tag which is described in the tail end of text data and does not appear in a measurement result of a road traffic amount, or may be binary data. A tag may follow a notation system which is employed in a markup language, for example. Tail information is a character string which is "<END>", for example.

The determination unit 805 determines whether or not the split 1 is provided with tail information, for example. Due to the function of the determination unit 805, it is possible to specify a series of splits which are processed as identical jobs in a group of sequentially-inputted splits. A determination result is stored in a storage region such as the RAM 403 and the magnetic disk 405.

When the determination unit 805 determines that a new split is provided with tail information, the second allocation unit 806 allocates reduce processing to any node in a node group. A processing object of the reduce processing is one or more processing results obtained by summarizing processing results of the map processing on the basis of attributes of the processing results of the map processing which is respectively executed to the series of splits.

For example, it is assumed that the detection unit 802 detects the split 1, the split 2, the split 3, and the split 4 in sequence and the determination unit 805 determines that the split 4 is provided with tail information. In this case, the second allocation unit 806 allocates reduce processing, of which a processing object is one or more processing results obtained by summarizing processing results of the map processing on the basis of attributes of the processing results of the map processing of which processing objects are the splits 1 to 4, to the slave nodes 102#1 and 102#2.

When it is determined that a new split is provided with tail information, the second allocation unit 806 may allocate second processing, of which a processing object is one or more processing results, in addition to a job ID, to any node in a node group. Due to the function of the second allocation unit 806, the distributed processing system 100 is capable of obtaining an output result of a job on the basis of a processing result of the map processing which is executed in a distributed manner.

Figure 9:
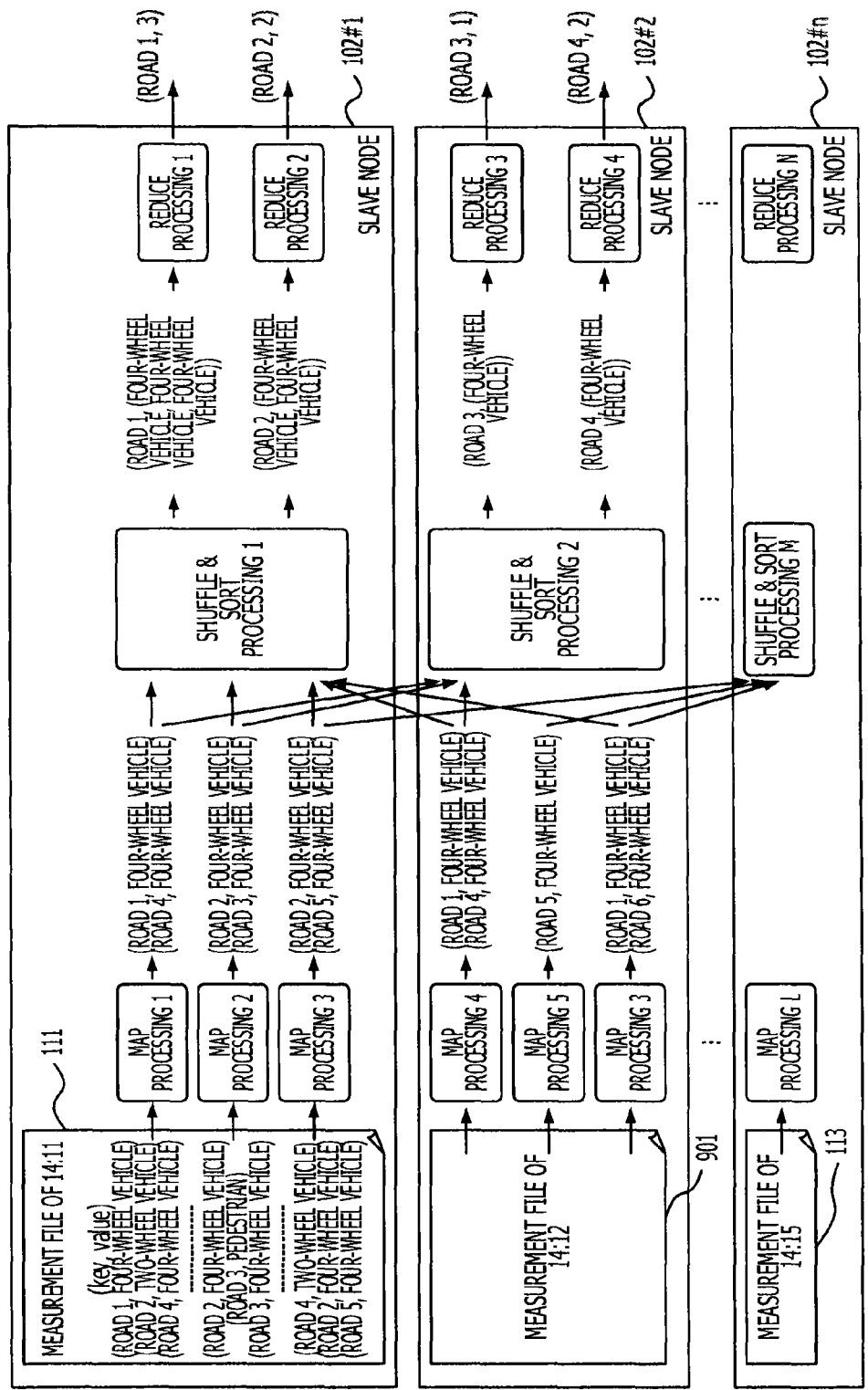
FIG. 9 illustrates a specific example of map-reduce processing.

FIG. 9 illustrates a specific example of map-reduce processing. FIG. 9 illustrates a specific example of a case where congestion information is calculated by using measurement files of 14:11 to 14:15. It is assumed that a record group of combinations between identification information of road as key and a road-passing type as value is described in the measurement file 111. It is assumed that road-passing types include three types which are "four-wheel vehicle", "two-wheel vehicle", and "pedestrian".

The first record is (road 1, four-wheel vehicle). The second record is (road 2, two-wheel vehicle). The third record is (road 4, four-wheel vehicle). The job tracker 501 sets a group of the first to third records as a split 1. The fourth record is (road 2, four-wheel vehicle). The fifth record is (road 3, pedestrian). The sixth record is (road 3, four-wheel vehicle). The job tracker 501 sets a group of the fourth to sixth records as a split 2. The seventh record is (road 4, two-wheel vehicle). The eighth record is (road 2, four-wheel vehicle). The ninth record is (road 5, four-wheel vehicle). The job tracker 501 sets a group of the seventh to ninth records as a split 3.

Map processing is processing for extracting a record in which "four-wheel vehicle" is stored in the value field. Reduce processing is processing for counting "four-wheel vehicles" for every road. The distributed processing system 100 calculates congestion information of each road by performing the map processing and the reduce processing. The distributed processing system 100 executes shuffle and sort processing between the map processing and the reduce processing.

When the job scheduler 502 detects that the split 1 has been inputted into the database 110, the job tracker 501 allocates the map processing 1 of which a processing object is the split 1 to the slave node 102#1. When the job scheduler 502 detects that the split 2 and the split 3 have been inputted, the job tracker 501 allocates the map processing 2 and the map processing 3 of which processing objects are respectively the split 2 and the split 3 to the slave node 102#1. The map processing is executed with respect to independent splits, enabling independent operations.

In the map processing 1, (road 1, four-wheel vehicle) and (road 4, four-wheel vehicle) are extracted among (road 1, four-wheel vehicle), (road 2, two-wheel vehicle), and (road 4, four-wheel vehicle). In the map processing 2, (road 2, four-wheel vehicle) and (road 3, four-wheel vehicle) are extracted among (road 2, four-wheel vehicle), (road 3, pedestrian), and (road 3, four-wheel vehicle). In the map processing 3, (road 2, four-wheel vehicle) and (road 5, four-wheel vehicle) are extracted among (road 4, two-wheel vehicle), (road 2, four-wheel vehicle), and (road 5, four-wheel vehicle). When the map processing 1 to the map processing 3 are completed, the job tracker 501 is notified of the processing completion via the task tracker 511.

In a similar manner, the job tracker 501 allocates map processing 4 to map processing 6 of which a processing object is a split group obtained by dividing a measurement file 901 of 14:12, to the slave node 102#2. In the map processing 4, (road 1, four-wheel vehicle) and (road 4, four-wheel vehicle) are extracted among splits obtained by dividing the measurement file 901. In the map processing 5, (road 5, four-wheel vehicle) is extracted among the splits obtained by dividing the measurement file 901. In the map processing 6, (road 1, four-wheel vehicle) and (road 6, four-wheel vehicle) are extracted among the splits obtained by dividing the measurement file 901. In a similar manner, the job tracker 501 allocates map processing L of which a processing object is a split group obtained by dividing the measurement file 113 of 14:15, to the slave node 102#n. L is an integer of 1 or more.

When the map processing 1 to the map processing L are completed, the job tracker 501 allows the slave nodes 102#1 to 102#n to execute the shuffle and sort processing 1 to M of which processing objects are processing results of the map processing 1 to the map processing L. M is an integer of 1 or more. For example, the job tracker 501 allocates the shuffle and sort processing 1 of which a processing object is a record of which the key field is "road 1" or "road 2", to the slave node 102#1. The job tracker 501 instructs the slave nodes 102 other than the slave node 102#1 to transmit a record of which the key field is "road 1" or "road 2" to the slave node 102#1. In a similar manner, the job tracker 501 allocates the shuffle and sort processing 2 of which a processing object is a record of which the key field is "road 3" or "road 4", to the slave node 102#2.

For example, in the shuffle and sort processing 1, records about "road 1" which is in the key field which is one of attributes of a processing result are summarized as (road 1, (four-wheel vehicle, four-wheel vehicle, four-wheel vehicle)). In the shuffle and sort processing 1, records about "road 2" are summarized as (road 2, (four-wheel vehicle, four-wheel vehicle)). In the shuffle and sort processing 2, records about "road 3" are summarized as (road 3, (four-wheel vehicle)). In the shuffle and sort processing 2, records about "road 4" are summarized as (road 4, (four-wheel vehicle, four-wheel vehicle)). The slave nodes 102 which execute shuffle and sort processing cooperate with each other to operate the shuffle and sort processing. The shuffle and sort processing is performed after all map processing is completed.

When the shuffle and sort processing is completed, the job tracker 501 allows the slave nodes 102#1 to 102#n to execute reduce processing 1 to reduce processing N of which processing objects are processing results of the shuffle and sort processing. N is an integer of 1 or more. For example, the job tracker 501 allocates the reduce processing 1 of which a processing object is a processing result obtained by summarizing records about "road 1", to the slave node 102#1. The job tracker 501 allocates the reduce processing 2 of which a processing object is a processing result obtained by summarizing records about "road 2", to the slave node 102#1. In a similar manner, the job tracker 501 allocates reduce processing 3 of which a processing object is a processing result obtained by summarizing records about "road 3" and reduce processing 4 of which a processing object is a processing result obtained by summarizing records about "road 4", to the slave node 102#2.

For example, in the reduce processing 1, the number of pieces of "four-wheel vehicle" is counted on the basis of (road 1, (four-wheel vehicle, four-wheel vehicle, four-wheel vehicle)) so as to output (road 1, 3). In the reduce processing 2, the number of pieces of "four-wheel vehicle" is counted on the basis of (road 2, (four-wheel vehicle, four-wheel vehicle)) so as to output (road 2, 2). In the reduce processing 3, the number of pieces of "four-wheel vehicle" is counted on the basis of (road 3, (four-wheel vehicle)) so as to output (road 3, 1). In the reduce processing 4, the number of pieces of "four-wheel vehicle" is counted on the basis of (road 4, (four-wheel vehicle, four-wheel vehicle)) so as to output (road 4, 2). The reduce processing is executed with respect to independent splits, enabling independent operations.

Figure 10:
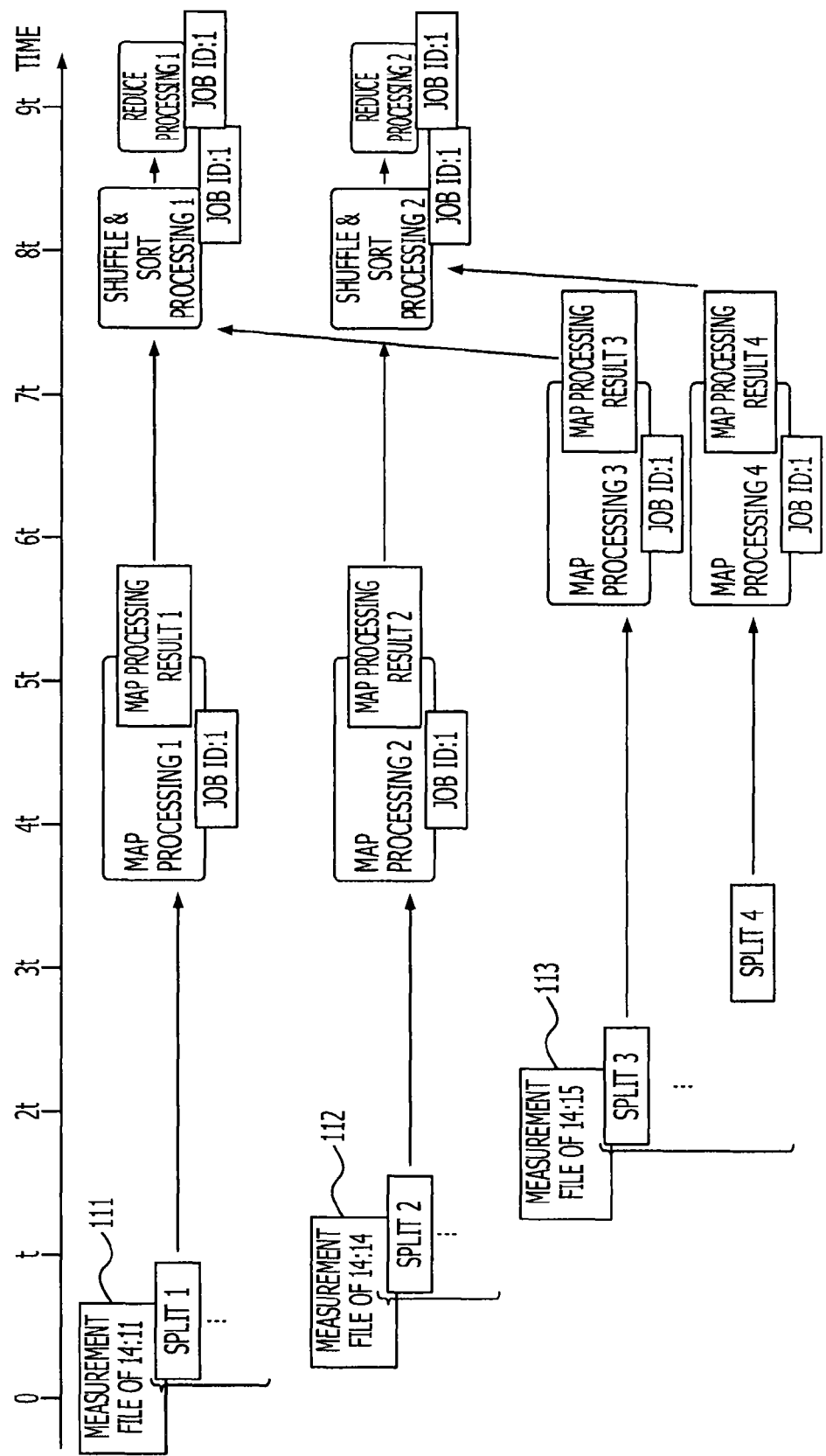
FIG. 10 illustrates an example of map-reduce processing for processing splits, which are inputted in sequence, at once.
Figure 11:
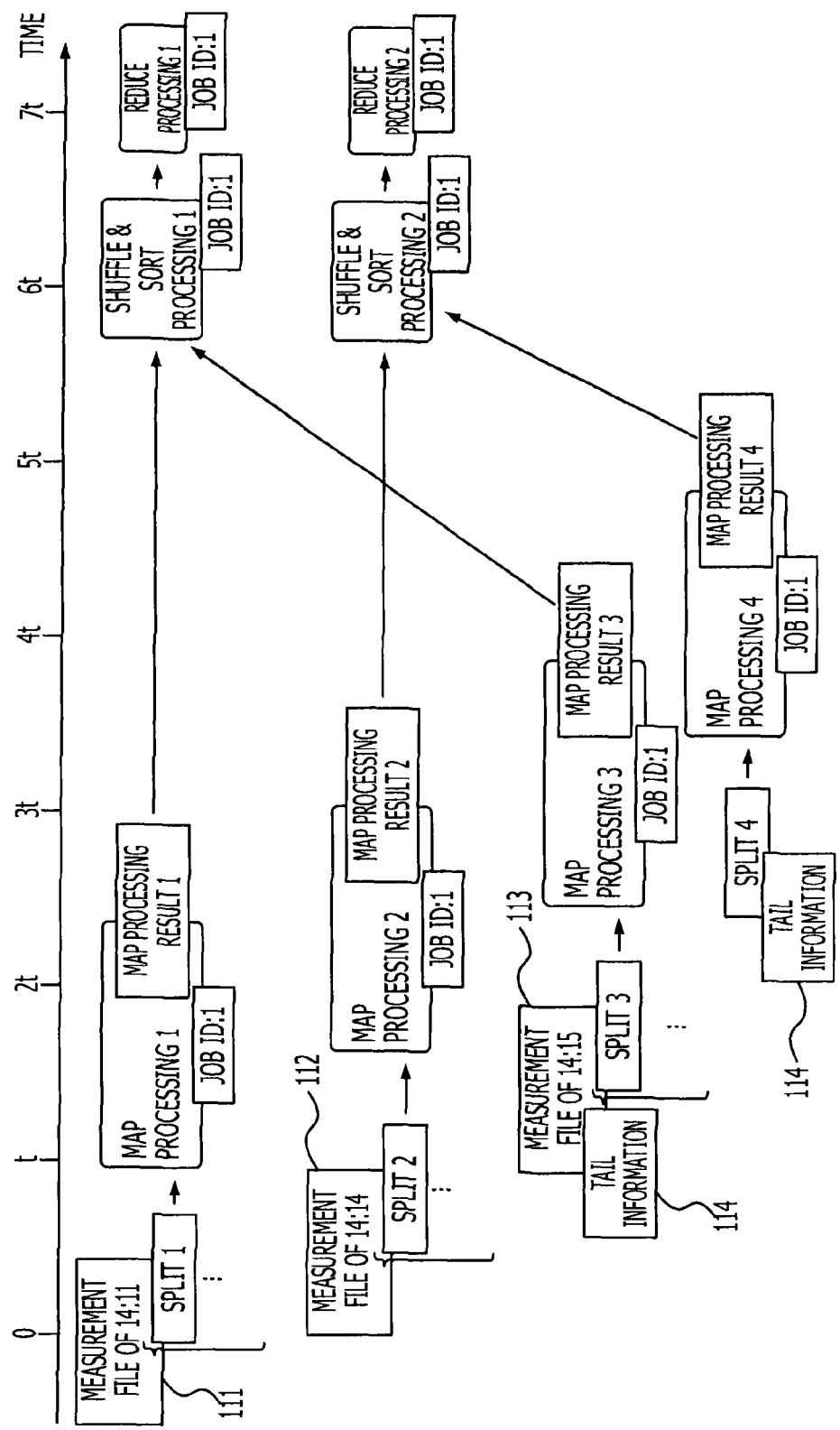
FIG. 11 illustrates a specific example of map-reduce processing for sequentially processing splits which are inputted in sequence.

Timing at which map-reduce processing is executed is now described with reference to FIGS. 10 and 11. FIG. 10 illustrates timing at which map-reduce processing is executed in a case where a split is not provided with tail information and sequentially-inputted splits are processed at once. FIG. 11 illustrates timing at which map-reduce processing is executed in a case where sequentially-inputted splits are processed in sequence, which is an operation of embodiment 1.

Description common in FIGS. 10 and 11 is now provided. In FIGS. 10 and 11, a time slot from time 0 to time 8t is depicted. Time intervals in a range from time 0 to time 8t are equal to each other and a single time interval is denoted as t. A processing time period of map processing is set as 2t, and a processing time period of shuffle and sort processing and a processing time period of reduce processing are set as 1t. It is assumed that the map processing, the shuffle and sort processing, and the reduce processing are executed in the slave nodes 102#1 and 102#2. Time at which the split 1 obtained by dividing the measurement file 111 is inputted into the database 110 is set as time 0. Time at which the split 2 obtained by dividing the measurement file 112 is inputted into the database 110 is set as time t. Time at which the split 3 obtained by dividing the measurement file 113 is inputted into the database 110 is set as time 2t. Time at which the split 4 obtained by dividing the measurement file 113 is inputted into the database 110 is set as time 3t.

It is assumed that a job, which is provided with job ID:1, for calculating congestion information by using measurement files of 14:11 to 14:15 is registered in the job client 301. Though processing with respect to measurement files of time 14:11 to time 14:13 is not depicted in FIGS. 10 and 11, it is assumed that the processing is performed in any slave node 102 among the slave nodes 102#1 to 102#n.

FIG. 10 illustrates an example of map-reduce processing in which sequentially-inputted splits are processed at once. When time becomes time 4t and splits obtained by dividing measurement files from 14:11 to 14:15 gather, the distributed processing system 100 depicted in FIG. 10 starts execution of the job having job ID:1. At time 4t, the job tracker 501 allocates the map processing 1 of which a processing object is the split 1 of the measurement file 111 and the map processing 3 of which a processing object is the split 3 of the measurement file 113, to the slave node 102#1. Further, the job tracker 501 allocates the map processing 2 of which a processing object is the split 2 of the measurement file 112 and the map processing 4 of which a processing object is the split 4 of the measurement file 113, to the slave node 102#2.

From time 4t to time 5t, the slave node 102#1 executes the map processing 1. After completion of the map processing 1, the slave node 102#1 executes the map processing 3 from time 6t to time 7t. In a similar manner, the slave node 102#2 executes the map processing 2 from time 4t to time 5t. After completion of the map processing 2, the slave node 102#2 executes the map processing 4 from time 6t to time 7t.

After completion of the map processing 1 to 4, the job tracker 501 allocates the shuffle and sort processing 1 of which processing objects are the map processing result 1 and the map processing result 3, to the slave node 102#1 at time 8t. In a similar manner, the job tracker 501 allocates the shuffle and sort processing 2 of which processing objects are the map processing result 2 and the map processing result 4, to the slave node 102#2 at time 8t.

At time 8t, the slave node 102#1 executes the shuffle and sort processing 1. After completion of the shuffle and sort processing 1, the slave node 102#1 executes the reduce processing 1 at time 9t. In a similar manner, the slave node 102#2 executes the shuffle and sort processing 2 at time 8t. After completion of the shuffle and sort processing 2, the slave node 102#2 executes the reduce processing 2 at time 9t. Thus, in a case of map-reduce processing in which sequentially-inputted files are processed at once, a processing time period of job ID:1 is 9t.

FIG. 11 illustrates a specific example of map-reduce processing in which sequentially-inputted splits are processed in sequence. At a time point when the split 1, which is a processing object of the job having job ID:1, of the measurement file 111 is inputted into the database 110 at time 0, the distributed processing system 100 depicted in FIG. 11 starts execution of the job having job ID:1. When the split 1 is inputted into the database 110, the job tracker 501 allocates the map processing 1 of which a processing object is the split 1, to the slave node 102#1. The slave node 102#1 executes the map processing 1 from time t to time 2t.

When the split 2 obtained by dividing the measurement file 112 is inputted at time t, the job tracker 501 allocates the map processing 2 of which a processing object is the split 2, to the slave node 102#2. The slave node 102#2 executes the map processing 2 from time 2t to time 3t.

When the split 3 obtained by dividing the measurement file 113 is inputted at time 2t, the job tracker 501 allocates the map processing 3 of which a processing object is the split 3, to the slave node 102#1. When the split 4 obtained by dividing the measurement file 113 is inputted at time 3t, the job tracker 501 allocates the map processing 4 of which a processing object is the split 4 of the measurement file 113, to the slave node 102#2. The slave node 102#1 executes the map processing 3 from time 3t to time 4t. After completion of the map processing 2, the slave node 102#2 executes the map processing 4 from time 4t to time 5t.

After completion of the map processing 1 to 4, the job tracker 501 allocates the shuffle and sort processing 1 of which processing objects are the map processing result 1 and the map processing result 3, to the slave node 102#1 at time 6t. In a similar manner, the job tracker 501 allocates the shuffle and sort processing 2 of which processing objects are the map processing result 2 and the map processing result 4, to the slave node 102#2 at time 6t.

The slave node 102#1 executes the shuffle and sort processing 1 at time 6t. After completion of the shuffle and sort processing 1, the slave node 102#1 executes the reduce processing 1 at time 7t. In a similar manner, the slave node 102#2 executes the shuffle and sort processing 2 at time 6t. After completion of the shuffle and sort processing 2, the slave node 102#2 executes the reduce processing 2. Thus, in a case of map-reduce processing in which inputted files are processed in sequence, a processing time period of job ID:1 is 7t. Map processing is possible to be performed ahead in the operation of FIG. 11 compared to the operation of FIG. 10, enabling reduction of a period of processing time for a job. Subsequently, map-reduce processing for performing the operation depicted in FIG. 11 is described with reference to FIGS. 12 and 13.

Figure 12:
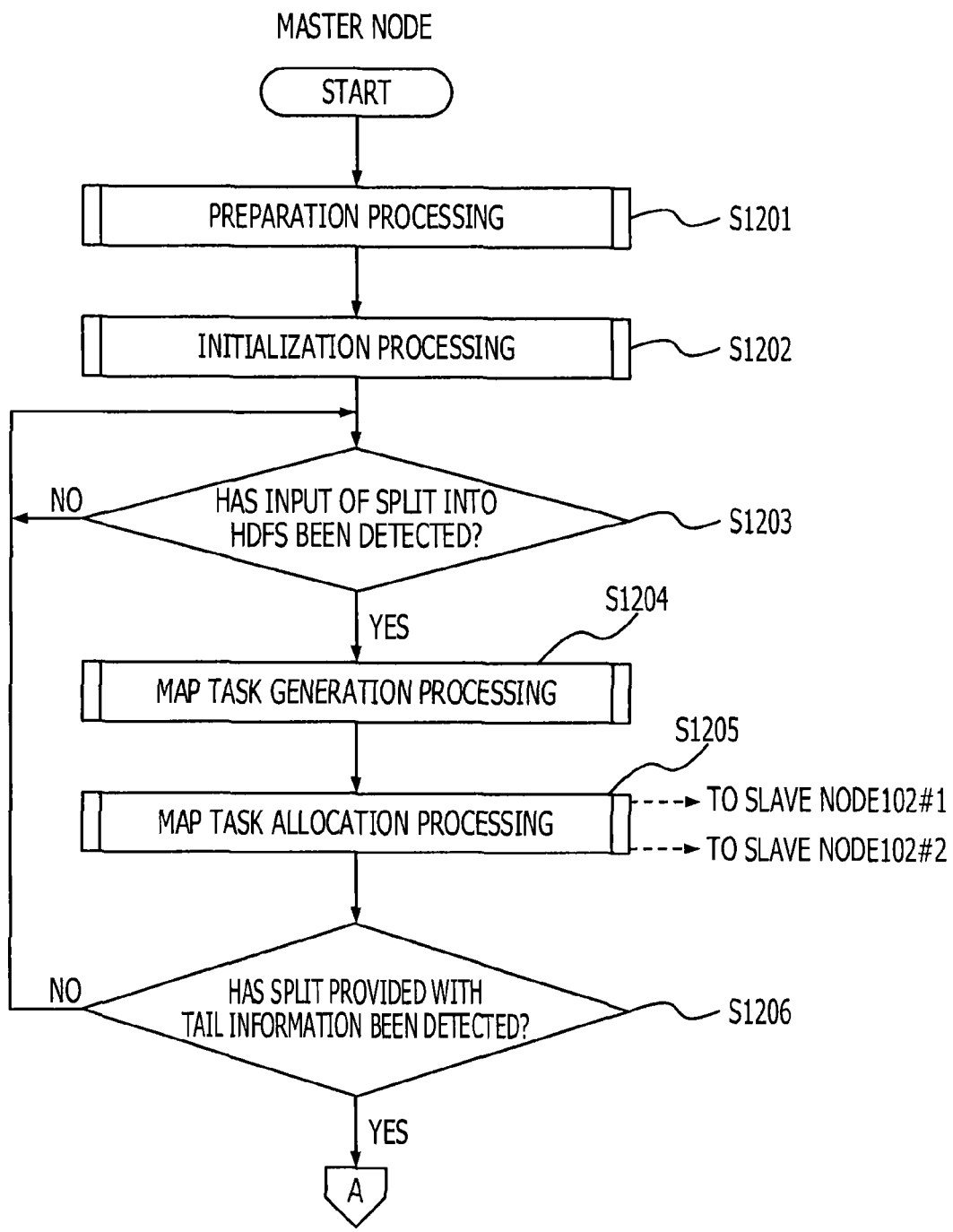
FIG. 12 is a flowchart (I) illustrating an example of a map-reduce processing procedure.
Figure 13:
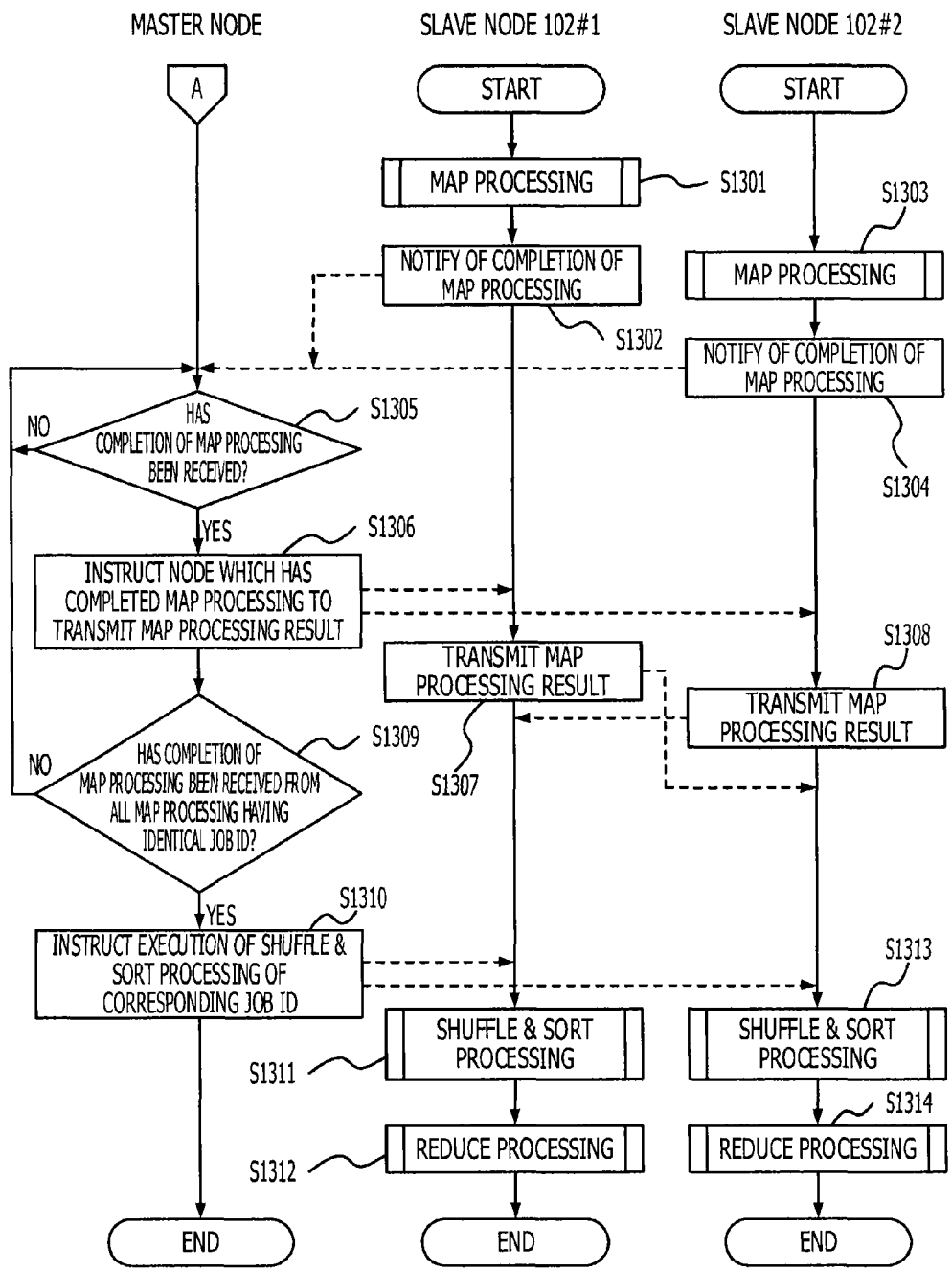
FIG. 13 is a flowchart (II) illustrating an example of a map-reduce processing procedure.

FIGS. 12 and 13 are respectively a flowchart (I) and a flowchart (II) illustrating an example of a map-reduce processing procedure. The map-reduce processing is processing which is executed when an execution request of a job is received. Referring to FIGS. 12 and 13, description is given on the assumption that the slave nodes 102 which execute the map-reduce processing are two slave nodes, namely, the slave nodes 102#1 and 102#2. In the master node 101, the job tracker 501 and the job scheduler 502 execute the map-reduce processing in cooperation with each other. In the slave nodes 102#1 and 102#2, the task tracker 511, the map task 514, and the reduce task 515 execute the map-reduce processing in cooperation with each other.

Referring to the flowchart of FIG. 12, the job tracker 501 executes preparation processing (S1201). The preparation processing will be described in detail later with reference to FIG. 14. After the execution of the preparation processing, the job tracker 501 and the job scheduler 502 execute initialization processing (S1202). The initialization processing will be described in detail later with reference to FIG. 15. After an end of the initialization processing, the job scheduler 502 determines whether or not to have detected input of a split into a HDFS (S1203). When there is no inputted split (S1203: No), the job scheduler 502 executes the processing of S1203 again after elapse of a certain period of time.

When there is an inputted split (S1203: Yes), the job scheduler 502 executes map task generation processing (S1204). The map task generation processing will be described in detail later with reference to FIG. 16. After the end of the map task generation processing, the job tracker 501 executes map task allocation processing (S1205). The map task allocation processing will be described in detail later with reference to FIG. 17. The slave nodes 102 to which the map task is allocated shift the processing to processing depicted in FIG. 13.

For example, when the map task 514 is allocated to the slave node 102#1 in the first processing of S1205, the task tracker 511#1 and the map task 514#1 execute processing of S1301 depicted in FIG. 13. When the map task 514 is allocated to the slave node 102#2 in the second processing of S1205, the task tracker 511#2 and the map task 514#2 execute processing of S1303 depicted in FIG. 13.

After an end of the map task allocation processing, the job scheduler 502 determines whether or not to have detected a split which is provided with tail information (S1206). Examples of the determination of whether or not to have detected a split provided with tail information include determination of whether or not detection of a split provided with tail information has been stored by later-described processing of S1605. When a split which is provided with tail information has not been detected (S1206: No), the job scheduler 502 shifts the processing to the processing of S1203. When a split provided with tail information has been detected (S1206: Yes), the job tracker 501 shifts the processing to processing of S1305 depicted in FIG. 13. In a case of S1206: Yes, the job scheduler 502 refers to an internal queue every certain period of time in the initialization processing until later-described processing of S1503 is performed.

Subsequently, referring to the flowchart of FIG. 13, the task tracker 511#1 and the map task 514#1 execute map processing (S1301). The map processing will be described in detail later with reference to FIG. 18. After an end of the map processing, the task tracker 511#1 notifies the master node 101 of the completion of the map processing (S1302). In a similar manner, the task tracker 511#2 and the map task 514#2 execute map processing (S1303). After an end of the map processing, the task tracker 511#2 notifies the master node 101 of the completion of the map processing (S1304).

After an end of the processing of S1206, the job tracker 501 determines whether or not to have received the completion of the map processing (S1305). When the completion of the map processing has not been received (S1305: No), the job tracker 501 executes the processing of S1305 again after elapse of a certain period of time. When the completion of the map processing has been received (S1305: Yes), the job tracker 501 instructs the slave node 102 which has completed the map processing, to transmit a map processing result (S1306).

The task tracker 511#1 which has received the instruction of transmission of the map processing result transmits the map processing result to the slave node 102#2 (S1307). At this time, the map processing result which is a transmission object is data which is a processing object of shuffle and sort processing and reduce processing which are to be executed in the slave node 102#2. In a similar manner, the task tracker 511#2 which has received the instruction of transmission of the map processing result transmits the map processing result to the slave node 102#1 (S1308).

After an end of the execution of the processing of S1306, the job tracker 501 determines whether or not to have received the completion of the map processing from all map processing having identical job IDs (S1309). When there is map processing of which completion has not been received among the map processing of identical job IDs (S1309: No), the processing shifts to processing of S1305. When the completion is received from all map processing having identical job IDs (S1309: Yes), the job tracker 501 instructs the slave nodes 102 to execute the shuffle and sort processing of the corresponding job ID (S1310). After an end of the processing of S1310, the job tracker 501 ends the map-reduce processing.

The task tracker 511#1 which has received the instruction of execution of the shuffle and sort processing allows the reduce task 515#1 to execute the shuffle and sort processing (S1311). The shuffle and sort processing will be described in detail later with reference to FIG. 19. After the execution of the shuffle and sort processing, the reduce task 515#1 executes reduce processing (S1312). The reduce processing will be described in detail later with reference to FIG. 20. After an end of the reduce processing, the task tracker 511#1 ends the map-reduce processing. The reduce task 515#1 also ends the processing after the end of the reduce processing.

The task tracker 511#2 which has received the instruction of execution of the shuffle and sort processing allows the reduce task 515#2 to execute the shuffle and sort processing (S1313). After the execution of the shuffle and sort processing, the reduce task 515#2 executes reduce processing (S1314). After an end of the reduce processing, the task tracker 511#2 ends the map-reduce processing. Due to the execution of the map-reduce processing, the distributed processing system 100 is capable of executing map processing in sequence regarding execution of a job when the distributed processing system 100 detects an inputted split and capable of reducing a processing time period for execution of a job.

Subsequently, flowcharts of processing which is called out through map-reduce processing are described with reference to FIGS. 14 to 20. In FIGS. 14 to 20, when an implementing body is a device including single software, depiction of the implementing body in each step is omitted for the sake of simplicity of the depiction.

Figure 14:
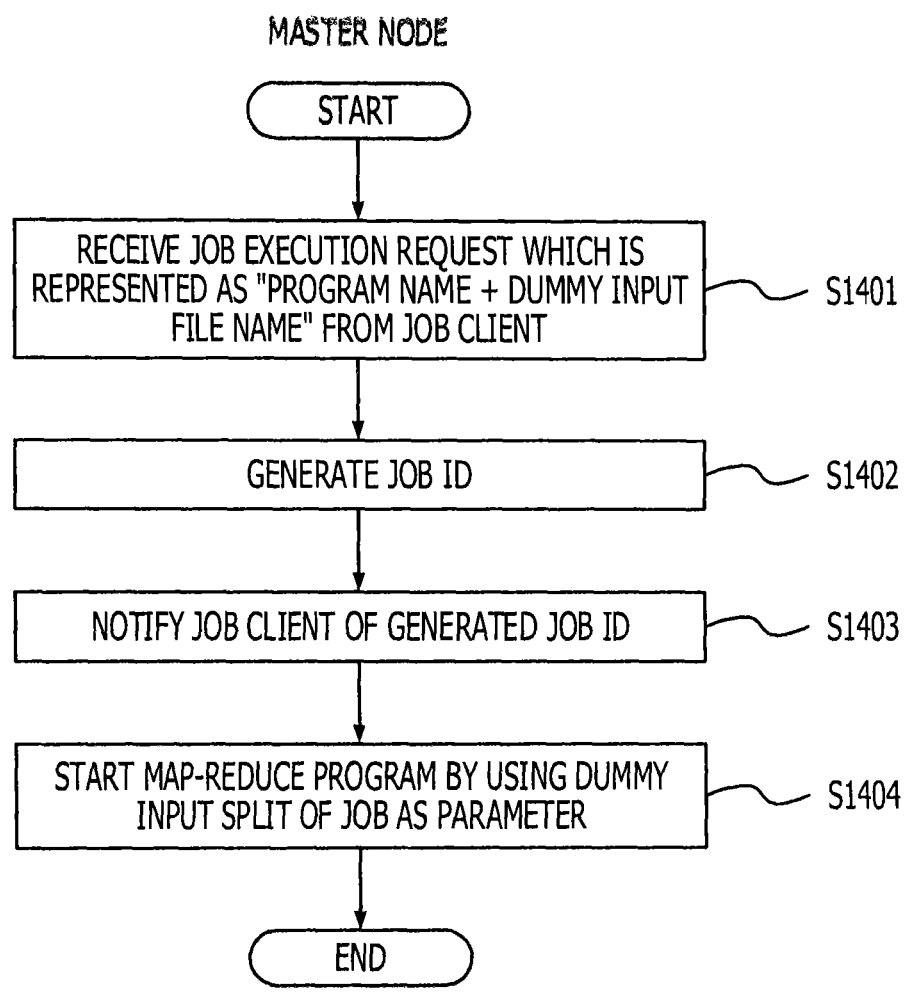
FIG. 14 is a flowchart illustrating an example of a preparation processing procedure.

FIG. 14 is a flowchart illustrating an example of a preparation processing procedure. The preparation processing is processing which is executed before execution of a job. The preparation processing is executed by the job tracker 501 of the master node 101.

The job tracker 501 receives a job execution request which is represented as "program name+dummy input file name" from the job client 301 (S1401). Then, the job tracker 501 generates a job ID (S1402). Subsequently, the job tracker 501 notifies the job client 301 of the generated job ID (S1403). The job tracker 501 starts the map-reduce program 521 by using a dummy input split of the job as a parameter (S1404). After completion of the execution of S1404, the job tracker 501 ends the preparation processing. Due to the execution of the preparation processing, the distributed processing system 100 is capable of starting execution of a job.

When a job execution request which is represented as "program name+actual input file name" is received in the processing of S1401, the distributed processing system 100 may execute the map-reduce processing depicted in FIG. 10. In this case, the job tracker 501 calculates an input split on the basis of an actual file after the execution of the processing of S1403. As specific calculation processing, the job tracker 501 divides an actual file for every 64 MB so as to calculate an input split. The distributed processing system 100 processes a route of Yes without performing the processing of S1203. The job tracker 501 sets the processing of S1206 as "have all splits obtained by dividing an actual file been read in?".

When a job execution request which is represented as "program name+actual file name+dummy input file name" is received in the processing of S1401, the distributed processing system 100 may execute the map-reduce processing depicted in FIG. 10 with respect to a split which has already been inputted. Subsequently, the distributed processing system 100 may execute the map-reduce processing depicted in FIG. 10 with respect to a split which is to be inputted from now.

When such processing is performed, the job tracker 501 calculates the number of inputted splits from an actual file after the execution of S1403. The distributed processing system 100 processes a route of Yes without performing the processing of S1203. The job tracker 501 sets the processing of S1206 as "have all splits obtained by dividing an actual file been read in?". After reading all splits, the job tracker 501 performs the processing of S1203. Further, the job tracker 501 sets the processing of S1206 as "has a split provided with tail information been detected?".

Figure 15:
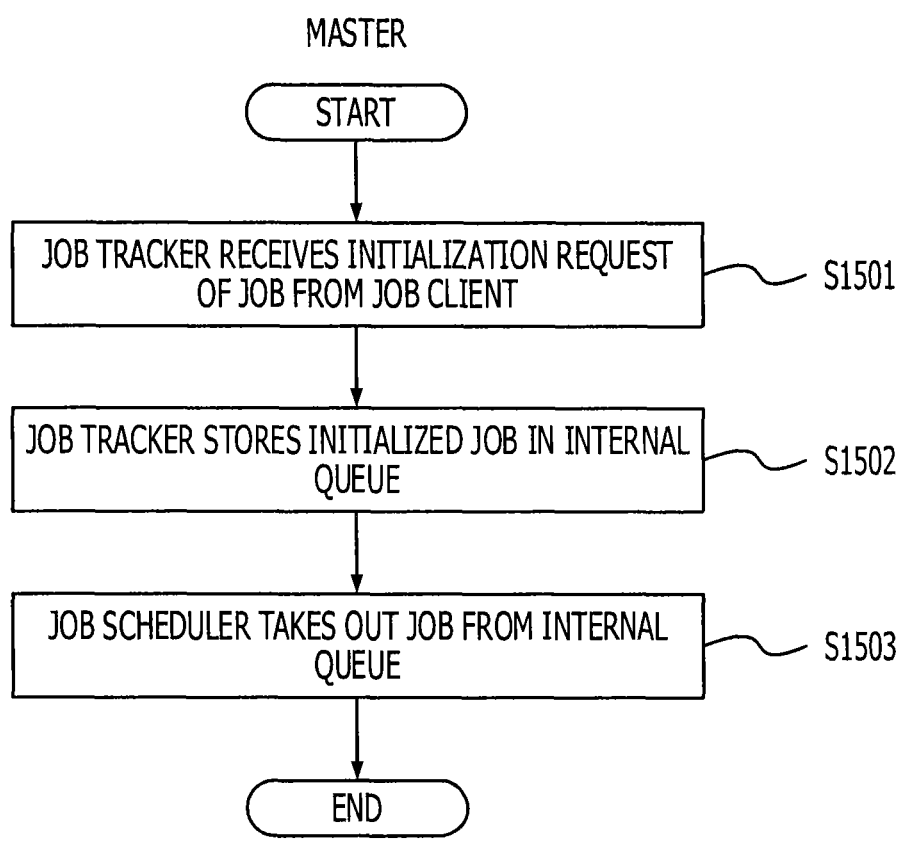
FIG. 15 is a flowchart illustrating an example of an initialization processing procedure.

FIG. 15 is a flowchart illustrating an example of an initialization processing procedure. The initialization processing is processing for performing initialization of a job. The job tracker 501 and the job scheduler 502 of the master node 101 execute the initialization processing in cooperation with each other. The job tracker 501 receives an initialization request of a job from the job client 301 (S1501). Then, the job tracker 501 stores an initialized job in an internal queue (S1502). After completion of the processing of S1503, the job tracker 501 ends the initialization processing.

The job scheduler 502 determines whether or not a job is present in the internal queue, at a given cycle. After the execution of the processing of S1502, the job scheduler 502 takes out a job from the internal queue (S1503). After completion of the processing of S1503, the job scheduler 502 ends the initialization processing. Due to the execution of the initialization processing, the distributed processing system 100 is capable of executing the processing in an order of jobs whose execution is requested.

Figure 16:
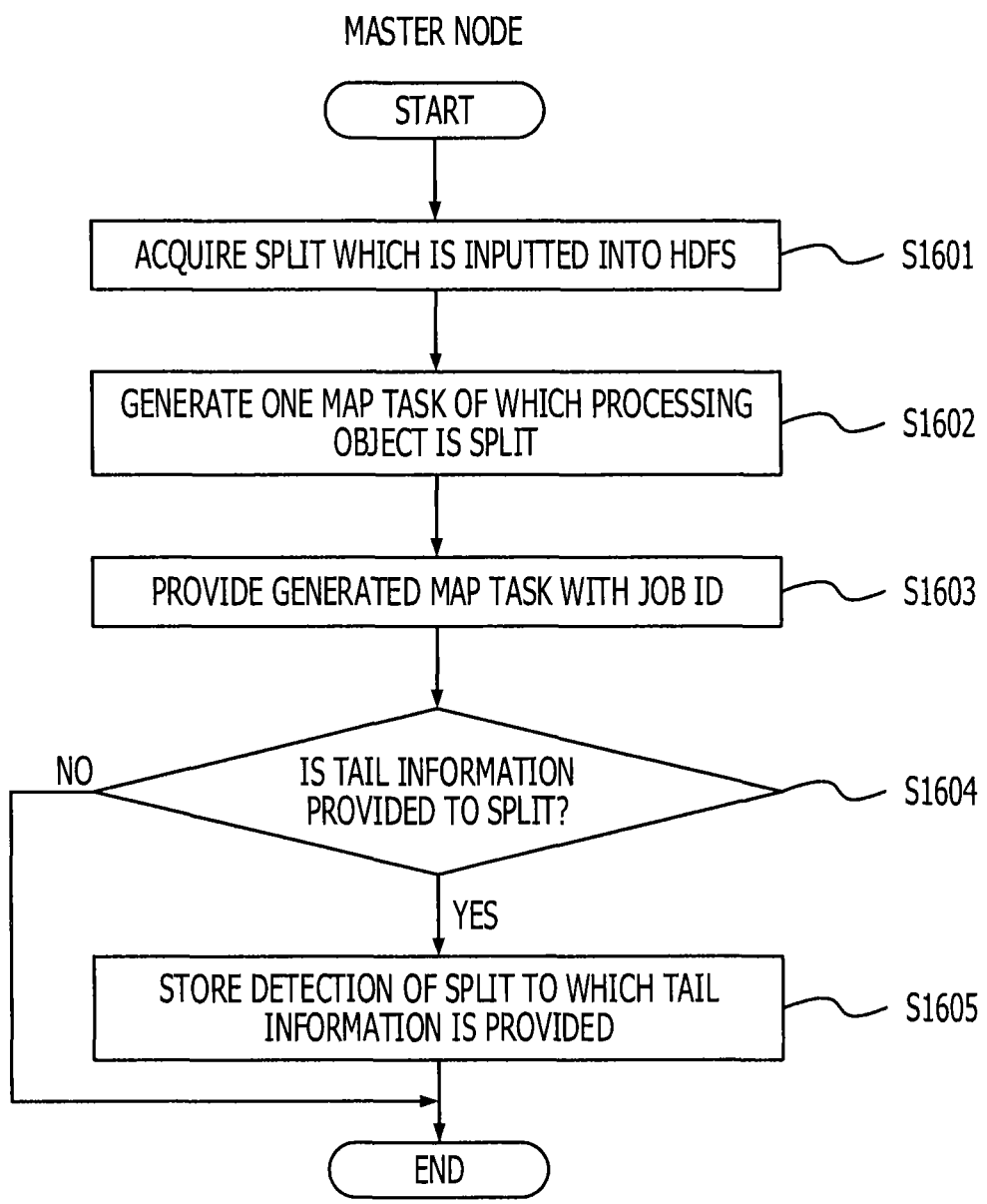
FIG. 16 is a flowchart illustrating an example of a map task generation processing procedure.

FIG. 16 is a flowchart illustrating an example of a map task generation processing procedure. The map task generation processing is processing for generating a map task 514 which is to be allocated to the slave node 102. The map task generation processing is executed by the job scheduler 502.

The job scheduler 502 acquires a split which is inputted into a HDFS (S1601). Then, the job scheduler 502 generates one map task 514 of which a processing object is a split (S1602). Subsequently, the job scheduler 502 provides the generated map task 514 with a job ID (S1603). Then, the job scheduler 502 determines whether or not tail information is provided to the split (S1604).

When tail information is provided (S1604: Yes), the job scheduler 502 stores the detection of a split to which tail information is provided (S1605). After completion of the processing of S1605 or when tail information is not provided (S1604: No), the job scheduler 502 ends the map task generation processing. Due to the execution of the map task generation processing, the distributed processing system 100 is capable of generating a map task 514 which is to be allocated to the slave node 102.

Figure 17:
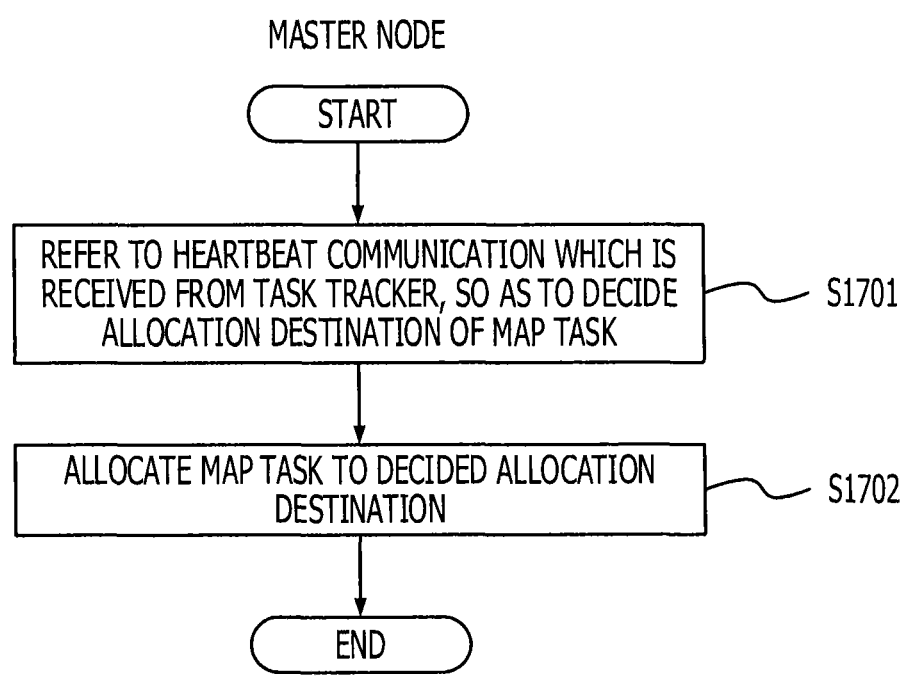
FIG. 17 is a flowchart illustrating an example of a map task allocation processing procedure.

FIG. 17 is a flowchart illustrating an example of a map task allocation processing procedure. The map task allocation processing is processing for allocating the map task 514 to the slave node 102. The map task allocation processing is executed by the job tracker 501 after generation of the map task 514 executed by the job scheduler 502.

The job tracker 501 refers to heartbeat communication which is received from the task tracker 511, so as to decide an allocation destination of the map task 514 (S1701). The heartbeat communication includes the number of tasks which are newly executable in respective slave nodes 102. For example, it is assumed that the maximum number of tasks which are executable by a certain slave node 102 is five and three tasks in total among map tasks 514 and reduce tasks 515 are in execution. In this case, the certain slave node 102 notifies the master node 101 of information indicating that the number of newly-executable tasks is two, in the heartbeat communication. The job tracker 501 decides a slave node 102 having the largest number of newly-executable tasks, for example, as an allocation destination of the map task 514 among the slave nodes 102#1 to 102#*n*.

After completion of the processing of S1701, the job tracker 501 allocates the map task 514 to the decided allocation destination (S1702). After completion of the processing of S1702, the job tracker 501 ends the map task allocation processing. Due to the execution of the map task allocation processing, the distributed processing system 100 is capable of distributing map processing to respective slave nodes 102.

Figure 18:
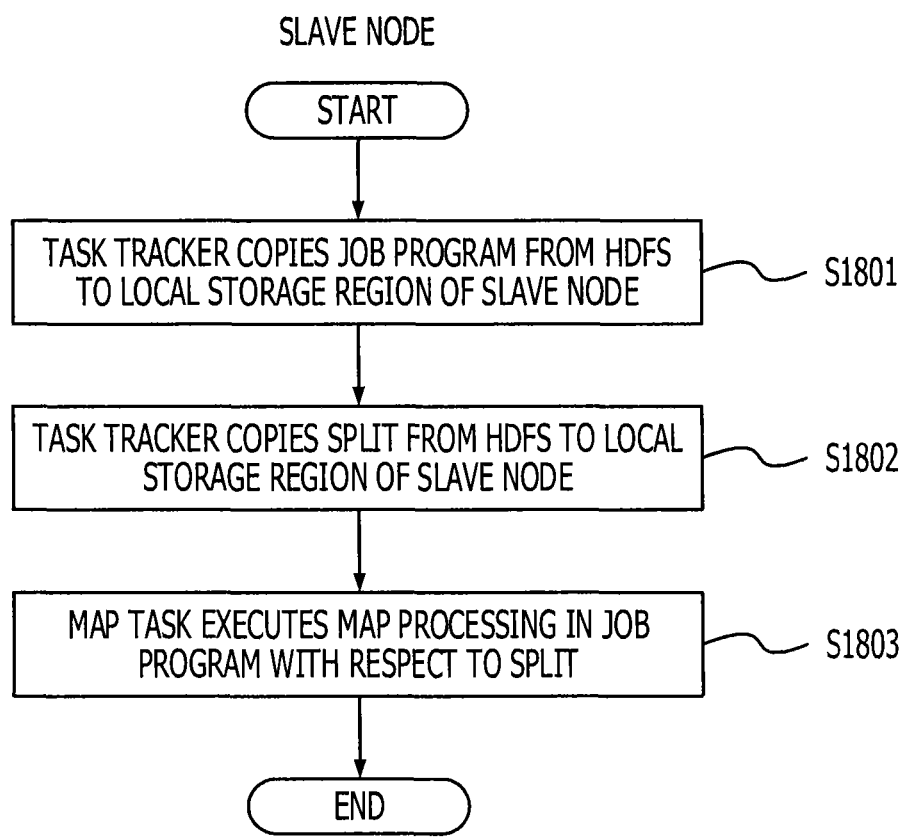
FIG. 18 is a flowchart illustrating an example of a map processing procedure.
Figure 19:
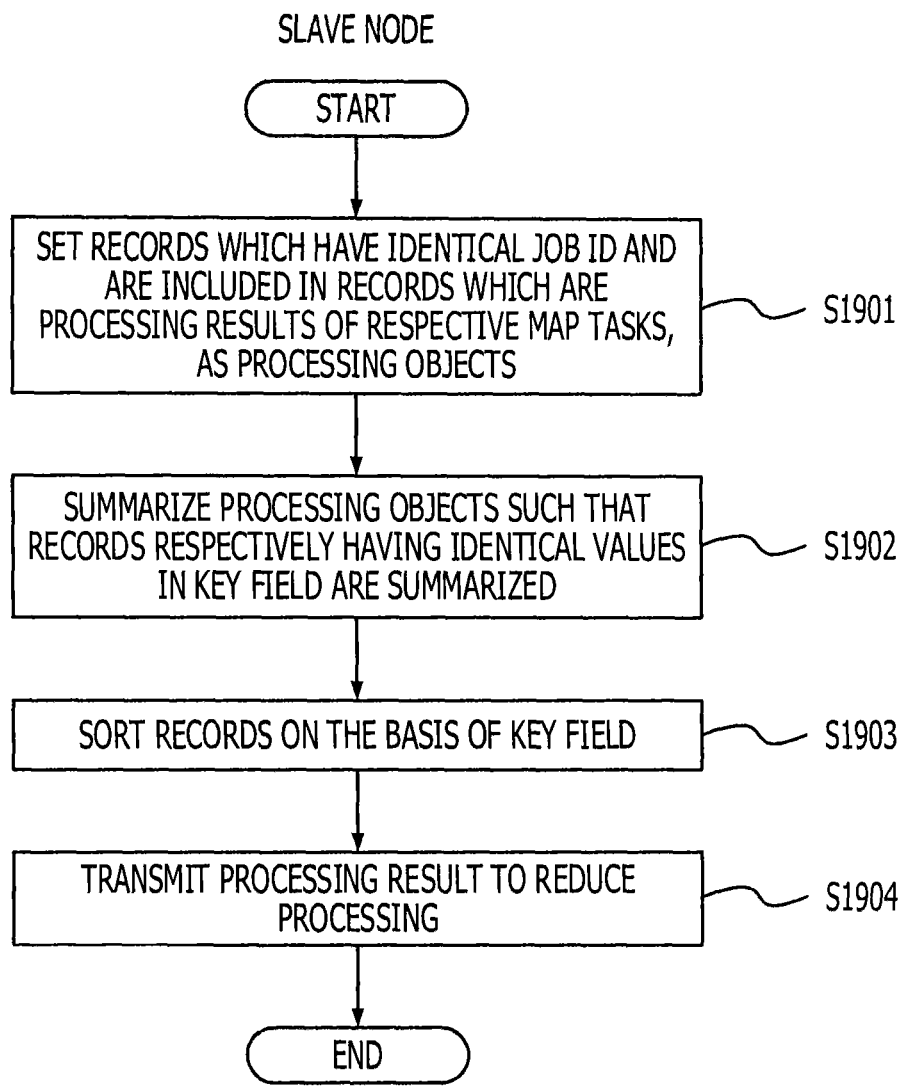
FIG. 19 is a flowchart illustrating an example of a shuffle and sort processing procedure.
Figure 20:
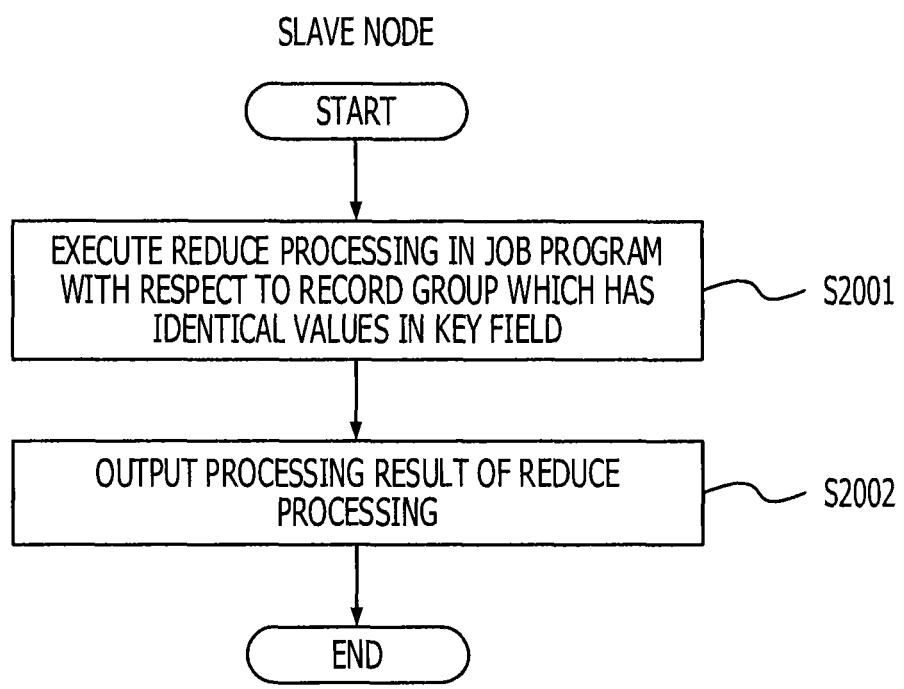
FIG. 20 is a flowchart illustrating an example of a reduce processing procedure.

FIGS. 18 to 20 are flowcharts illustrating processing which is performed in the slave node 102. Any slave node 102 among the slave nodes 102#1 to 102#*n* performs the flowcharts depicted in FIGS. 18 to 20. A case where the slave node 102#1 performs the flowcharts is described as an example for the sake of simplicity of the description.

FIG. 18 is a flowchart illustrating an example of a map processing procedure. The map processing is processing for generating (key, value) from a split which is a processing object. The task tracker 511#1 and the map task 514#1 which is allocated to the slave node 102#1 execute the map processing in cooperation with each other.

The task tracker 511#1 copies a job program from a HDFS to a local storage region of the slave node 102#1 (S1801). Subsequently, the task tracker 511#1 copies a split from the HDFS to the local storage region of the slave node 102#1 (S1802). After completion of the processing of S1802, the task tracker 511#1 ends the map processing.

Subsequently, the map task 514#1 executes map processing in the job program with respect to the split (S1803). After completion of the processing of S1803, the map task 514#1 ends the map processing. Due to the execution of the map processing, the distributed processing system 100 is capable of executing processing of a job with respect to a split, which is obtained by division, independently from other splits.

FIG. 19 is a flowchart illustrating an example of a shuffle and sort processing procedure. The shuffle and sort processing is processing for summarizing processing results of the map processing to one or more processing results. The shuffle and sort processing is executed by the reduce task 515#1 which is allocated to the slave node 102#1.

The reduce task 515#1 sets records which have identical job IDs and are included in records which are processing results of respective map tasks, as processing objects (S1901). Then, the reduce task 515#1 summarizes the processing objects such that records respectively having identical values in the key field are summarized (S1902). Subsequently, the reduce task 515#1 sorts the records on the basis of the key field (S1903). Then, the reduce task 515#1 transmits the processing result to the reduce processing (S1904). After completion of the processing of S1904, the reduce task 515#1 ends the shuffle and sort processing. By using a processing result of the shuffle and sort processing, the slave node 102 easily executes reduce processing which is next executed.

FIG. 20 is a flowchart illustrating an example of a reduce processing procedure. In the reduce processing, a summarized processing result is processed so as to output a processing result of a job. The reduce processing is executed by the reduce task 515#1.

The reduce task 515 executes the reduce processing in a job program with respect to a record group which has identical values in the key field (S2001). Then, the reduce task 515 outputs a processing result of the reduce processing (S2002). After completion of the processing of S2002, the reduce task 515 ends the reduce processing. Due to the execution of the reduce processing, the distributed processing system 100 is capable of presenting an output result with respect to a device which has requested the job client 301 to execute the job.

As described above, the information processing device according to embodiment 1 sequentially allocates map processing with respect to splits which are inputted into the database 110 in sequence and shifts processing to shuffle processing after completion of the map processing of a split which is provided with tail information for job separation. The distributed processing system 100 allocates map processing to splits in sequence and waits for execution of shuffle and sort processing until input of a split provided with tail information, being able to avoid concentration of time slots for execution of map processing of identical jobs.

For example, the distributed processing system 100 executes the map processing in advance while avoiding concentration of time slots for execution of map processing. Accordingly, time for wait for execution of the map processing is shortened, being able to shorten a period of processing time of identical jobs. When time slots for execution of map processing of identical jobs are concentrated, access loads on the database 110 are increased and it takes time to acquire splits, causing delay of map processing. The distributed processing system 100 according to embodiment 1 is capable of avoiding concentration of time slots for execution of map processing of identical jobs. Therefore, access loads do not increase, enabling suppression of delay of the map processing. The distributed processing system 100 is capable of acquiring a correct processing result without acquiring the number of splits which are included in a current job.

When the information processing device according to embodiment 1 receives a start request, the information processing device may start execution of processing for detecting input of a new split. Accordingly, the distributed processing system 100 is capable of switching of processing such that the distributed processing system 100 performs the map-reduce processing depicted in FIG. 11 when receiving a dummy file which is a start request, and performs the map-reduce processing depicted in FIG. 10 when receiving an actual file. In the map-reduce processing depicted in FIG. 10, map processing is performed at once. Therefore, it is possible to shorten a period of time in which respective slave nodes 102 hold processing results of the map processing.

For example, when there is a job for performing processing by using a measurement file per day for one month, a processing result of the map processing with respect to a measurement file of the first day is kept to be held for a month in the map-reduce processing depicted in FIG. 11. When executing such job, the distributed processing system 100 first receives an actual split to be able to execute the map-reduce processing depicted in FIG. 10. The information processing device finds that allocation of map processing is performed from now, in advance, by receiving a start request, being able to prepare the allocation. For example, when the database 110 is a HDFS, it is possible to preliminarily check whether or not there is a slave node 102 to which no task is allocated.

The distributed processing system 100 may perform the map-reduce processing depicted in FIG. 10 with respect to an inputted split and subsequently perform the map-reduce processing depicted in FIG. 11 with respect to a split which is to be inputted from now. For example, such case is assumed that there is a job for performing processing by using a measurement file per day for one month and the job is started on the 29th day. In this case, the distributed processing system 100 performs the map-reduce processing depicted in FIG. 10 with respect to measurement files of the first to 29th day. Subsequently, the distributed processing system 100 waits for input of a measurement file of the 30th day and performs the map-reduce processing depicted in FIG. 11 with respect to a split obtained by dividing the measurement file after the input of the measurement file.

The information processing device according to embodiment 1 may allocate a job ID and map processing to the slave node 102 and allocate a job ID and reduce processing to the slave node 102. Accordingly, when processing results of map processing for a plurality of jobs are stored in the slave node 102, the job tracker 501 is capable of designating a split which is to be a summarization object by using a job ID.

Embodiment 2

The distributed processing system 100 according to embodiment 1 executes map processing as identical jobs with respect to splits which are inputted into the database 110 in sequence, until the distributed processing system 100 detects a split provided with tail information. However, an order of splits which are inputted into the database 110 may not become as expected. For example, it is assumed that the job tracker 501 divides the measurement file 113 and inputs splits into the database 110 in an order of a split 3 and a split 4 which is provided with tail information. When a transmission error occurs in the process of input of the split 3 and retransmission of the split 3 is performed, the split 4 is inputted into the database 110 before the split 3. When the data size of the split 4 is smaller than that of the split 3 and therefore input of the split 4 is completed before the split 3, as well, the split 4 is inputted into the database 110 before the split 3.

When the above-described phenomena occur, the distributed processing system 100 according to embodiment 1 handles the split 3 as a processing object of the next job. Therefore, an expected processing result may not be obtained. A distributed processing system 100 according to embodiment 2 is capable of obtaining a correct processing result even if an order of input of splits is not guaranteed. Elements same as those of embodiment 1 are given the same reference characters and description thereof is omitted.

Figure 21:
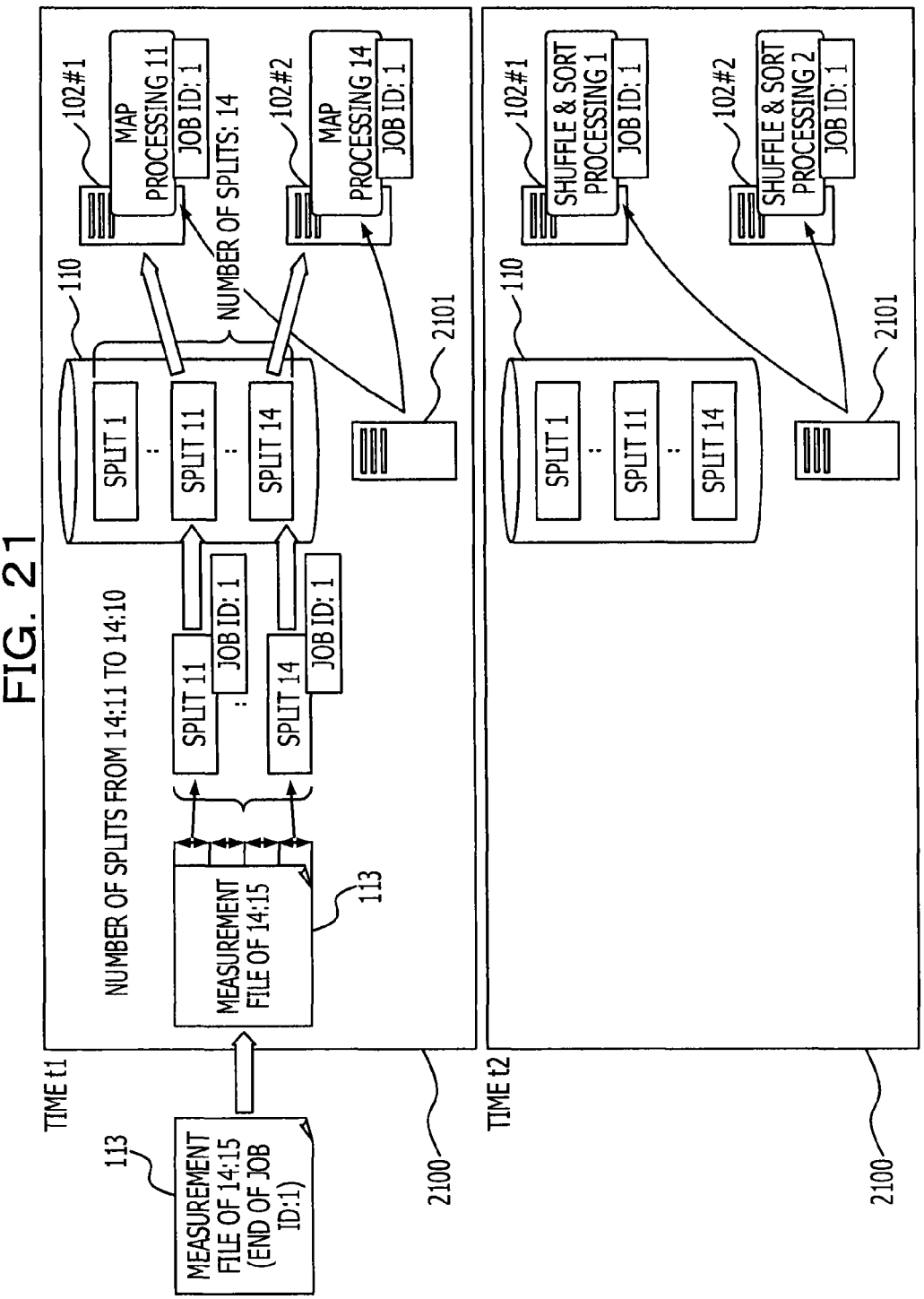
FIG. 21 illustrates an example of an operation of a distributed processing system according to embodiment 2.

FIG. 21 illustrates an operation example of a distributed processing system according to embodiment 2. A distributed processing system 2100, which is depicted in FIG. 21, according to embodiment 2 includes a master node 2101 according to embodiment 2, slave nodes 102, and a database 110. FIG. 21 illustrates a state of the distributed processing system 2100 at time t1 and a state at time t2. It is assumed that time elapses in an order of time t1 and time t2. It is assumed that the master node 2101 divides a measurement file into splits in the distributed processing system 2100.

It is assumed that the master node 2101 has received an execution request of a job for calculating congestion information, before time t1 depicted in FIG. 21. At this time, the master node 2101 generates job ID:1 with respect to the job. Subsequently, the master node 2101 receives measurement files of 14:11 to 14:14. At this time, the master node 2101 divides the measurement files of 14:11 to 14:14 and provides information indicating the job ID:1 to respective splits. The master node 2101 stores the number of the splits. It is assumed that the master node 2101 stores the number of splits from 14:11 to 14:14 as 10 at a time point before time t1. Subsequently, the master node 2101 allocates map processing of which processing objects are the ten pieces of splits, to each of the slave node 102#1 and the slave node 102#2.

When receiving the measurement file 113 of 14:15 at time t1 depicted in FIG. 21, the master node 2101 divides the measurement file 113 into four pieces of splits. The master node 2101 determines that the measurement file 113 of 14:15 is a tail file of the job ID:1 and stores the number of a series of splits which are processing objects of the job ID:1 as 10+4=14. As a method for determining that the measurement file 113 is a tail file of the job ID:1, the job client 301 notifies the master node 2101 that the measurement file 113 is the tail file of the job ID:1, for example.

After division for the splits, the master node 2101 provides splits 11 to 14 obtained by the division with the job ID:1. Subsequently, the master node 2101 inputs the splits 11 to 14 into the database 110. At this time, an input order of the splits 11 to 14 into the database 110 may be any order. When the master node 2101 detects that any split among the splits 11 to 14 is inputted into the database 110, the master node 2101 allocates map processing of which a processing object is any split, to the slave nodes 102#1 and 102#2.

The master node 2101 counts the number of splits which are inputted into the database 110 and compares the number with the counted number of a series of splits which are processing objects of the job ID:1. When the number of a series of splits agrees with the number of the inputted splits, the master node 2101 determines that any split is a tail split of the series of splits. An operation after the determination is described with reference to time t2.

At time t2 depicted in FIG. 21, the master node 2101 allocates shuffle and sort processing 1 and 2 for summarizing processing results of map processing on the basis of attributes of the map processing results, respectively to the slave node 102#1 and the slave node 102#2. Thus, the distributed processing system 2100 sequentially executes map processing with respect to data which is inputted into the database in sequence, and shifts the processing to shuffle processing when the number of inputted splits agrees with the number of a series of splits. Accordingly, the distributed processing system 2100 is capable of obtaining a correct processing result even if an input order of splits is not guaranteed. The distributed processing system 2100 according to embodiment 2 is described below with reference to FIGS. 22 to 25.

Figure 22:
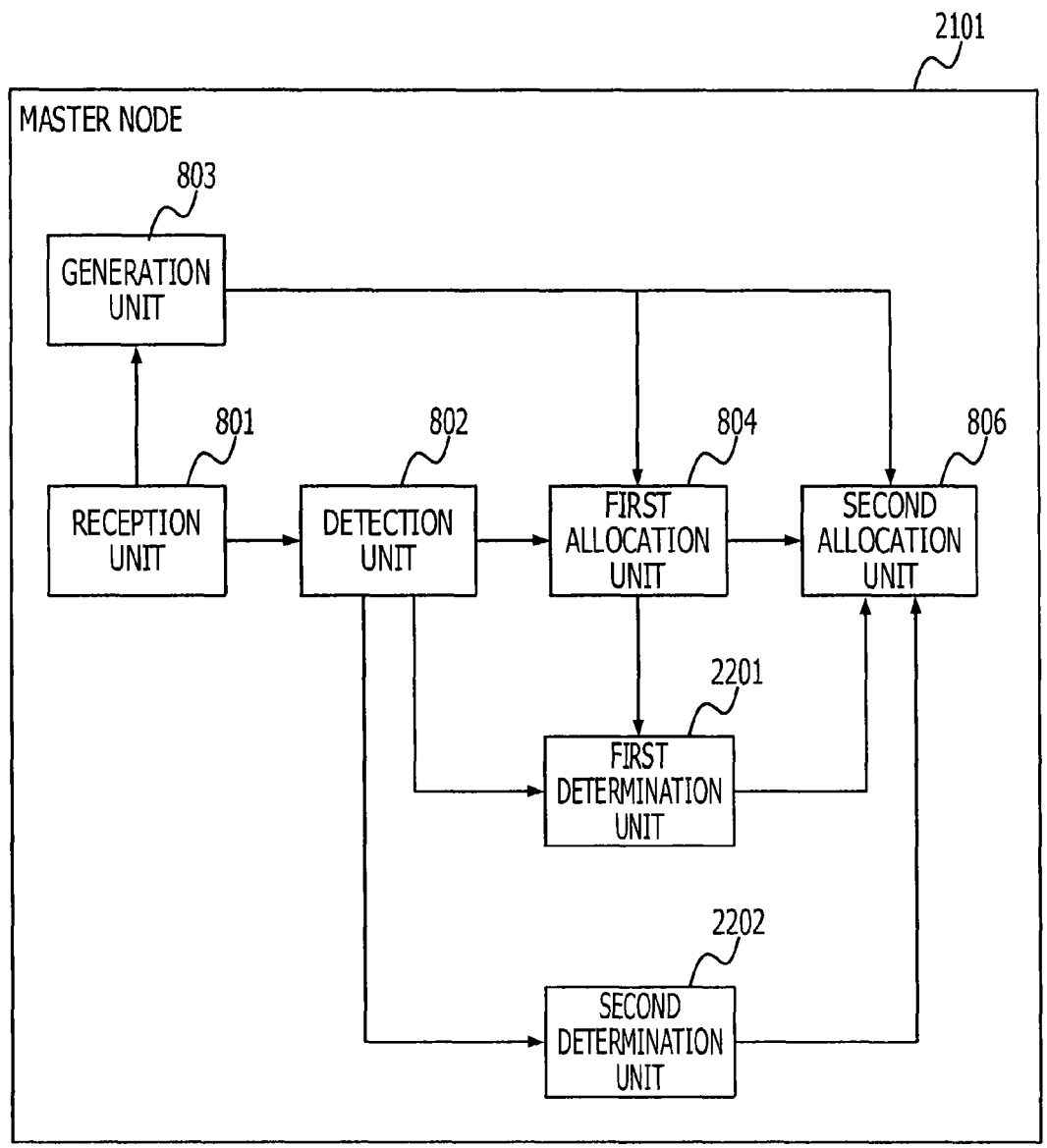
FIG. 22 is a block diagram illustrating an example of the functional configuration of a master node according to embodiment 2.

FIG. 22 is a block diagram illustrating a functional configuration example of a master node according to embodiment 2. The master node 2101 according to embodiment 2 includes a reception unit 801, a detection unit 802, a generation unit 803, a first allocation unit 804, a second allocation unit 806, a first determination unit 2201, and a second determination unit 2202.

The CPU 401 executes a program which is stored in a storage device so as to realize functions of the reception unit 801, the detection unit 802, the generation unit 803, the first allocation unit 804, the second allocation unit 806, the first determination unit 2201, and the second determination unit 2202 which are control units. Specifically, the storage device is the ROM 402, the RAM 403, and the magnetic disk 405 depicted in FIG. 4, for example. Alternatively, another CPU may execute the program via the IF 406 so as to realize the functions of the reception unit 801, the detection unit 802, the generation unit 803, the first allocation unit 804, the second allocation unit 806, the first determination unit 2201, and the second determination unit 2202. The functions of the reception unit 801, the detection unit 802, the generation unit 803, and the first allocation unit 804 according to embodiment 2 are same as those of the reception unit 801, the detection unit 802, the generation unit 803, and the first allocation unit 804, so that the description thereof is omitted.

When the following condition is satisfied, the first determination unit 2201 determines whether or not a split group is inputted into the database 110, on the basis of the number of splits which are included in the data group and the number of splits which are inputted into the database 110. The condition is a case where input of a new split is detected by the detection unit 802. The split group is a single file, for example. The number of splits which are inputted into the database 110 may be the number of splits which are inputted into a local storage region of the master node 2101.

For example, when the number of splits which are included in the file agrees with the number of inputted splits, the first determination unit 2201 determines that a split group obtained by dividing a file has been inputted into the database 110. When the number of splits which are included in the file differs from the number of inputted splits, the first determination unit 2201 determines that there is a split which has not been inputted into the database 110 in the split group obtained by dividing the file.

When input of a new split is detected by the detection unit 802, the first determination unit 2201 may increment the number of splits which are inputted into the database 110. In a case where the current number of splits which are inputted into the database 110 is 10 and input of a new split is detected by the detection unit 802, for example, the first determination unit 2201 increments the number of inputted splits to 11.

When the first allocation unit 804 allocates map processing to any node in a node group, the first determination unit 2201 may increment the number of pieces of data which are inputted into the database 110. In a case where the current number of splits which have been inputted into the database 110 is 10 and map processing is allocated to any node by the first allocation unit 804, for example, the determination unit 2201 increments the number of inputted splits to 11. A determination result is stored in a storage region such as the RAM 403 and the magnetic disk 405.

When input of a new split is detected by the detection unit 802, the second determination unit 2202 determines whether or not the split group is a tail split group of a series of split groups which are processing objects of the map processing. For example, when the master node 2101 receives transmission of a tail file from the job client, the reception of the tail file is stored. The second determination unit 2202 refers to a storage region which stores the reception of the tail file. In a case where the tail file has been received, the second determination unit 2202 determines that a file which is a division origin of the split group is a tail file of a series of files which are processing objects of the map processing.

When the following condition is satisfied, the second allocation unit 806 allocates reduce processing to any node in a node group. The condition is a case where the first determination unit 2201 determines that the split group is inputted into the database 110 and the second determination unit 2202 determines that the split group is the tail split group of a series of split groups. Detailed description of the second allocation unit 806 according to embodiment 2 is omitted because execution timing of the second allocation unit 806 is merely different from that of the second allocation unit 806 according to embodiment 1.

Map-reduce processing according to embodiment 2 and processing called by the map-reduce processing according to embodiment 2 are described below with reference to FIGS. 23 to 25. A flowchart (II) illustrating an example of a map-reduce processing procedure according to embodiment 2 is same as the flowchart (II) illustrating an example of the map-reduce processing procedure depicted in FIG. 13, so that description thereof is omitted. Preparation processing, initialization processing, map task allocation processing, shuffle and sort processing, and reduce processing according to embodiment 2 have the same processing contents as the processing having the same names according to embodiment 1, so that description thereof is omitted.

Figure 23:
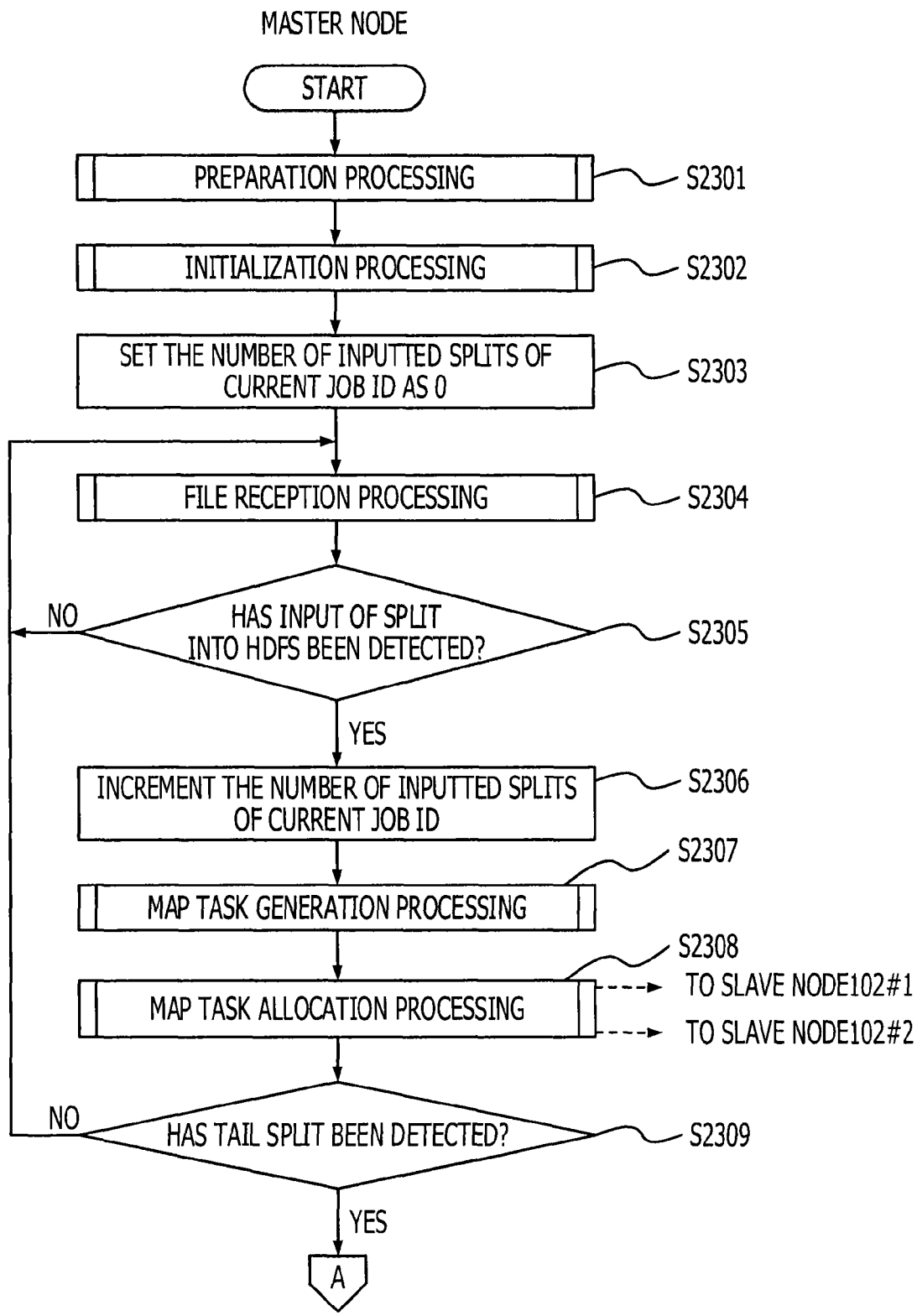
FIG. 23 is a flowchart (I) illustrating an example of a map-reduce processing procedure according to embodiment 2.

FIG. 23 is a flowchart (I) illustrating an example of a map-reduce processing procedure according to embodiment 2. In the map-reduce processing according to embodiment 2, S2301, S2302, S2305, S2307, and S2308 are same as S1201 to S1205, so that description thereof is omitted.

After an end of S2302, the job scheduler 502 sets the number of inputted splits of a current job ID to 0 (S2303). After execution of S2303, the job tracker 501 executes file reception processing (S2304). The file reception processing will be described later with reference to FIG. 24. After the execution of S2304, the job scheduler 502 executes processing of S2305. When there is an inputted split (S2305: Yes), the job scheduler 502 increments the number of inputted splits of the current job ID (S2306). After completion of the execution of S2306, the job scheduler 502 executes processing of S2307.

In S2306, when information different from information indicating the current job ID is not provided to an inputted split, the job scheduler 502 does not increment the number of pieces of inputted data of the current job ID. Then, the job scheduler 502 shifts the processing to processing of S2304.

After completion of execution of S2308, the job scheduler 502 determines whether or not a tail split has been detected (S2309). When a tail split has not been detected (S2309: No), the job scheduler 502 shifts the processing to the processing of S2304. When a tail split has been detected (S2309: Yes), the job scheduler 502 shifts the processing to a flowchart (II) illustrating an example of a map-reduce processing procedure.

Figure 24:
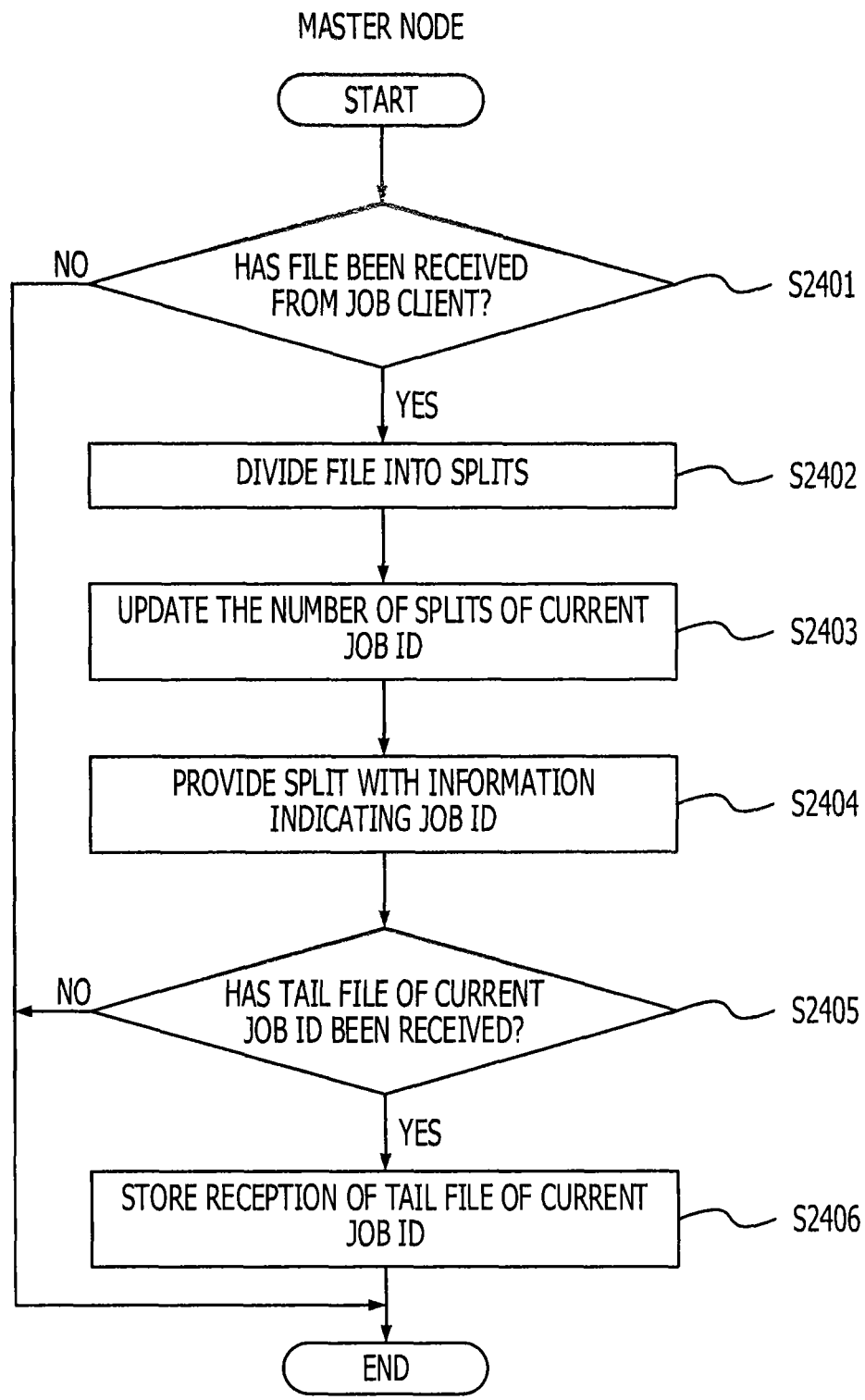
FIG. 24 is a flowchart illustrating an example of a file reception processing procedure.

FIG. 24 is a flowchart illustrating an example of a file reception processing procedure. The file reception processing is processing which is performed after initialization processing. The file reception processing is executed by the job tracker 501 of the master node 2101.

The job tracker 501 determines whether or not to have received a file from the job client 301 (S2401). When the job tracker 501 has received a file (S2401: Yes), the job tracker 501 divides the file into splits (S2402). Subsequently, the job tracker 501 updates the number of splits of a current job ID (S2403). Specifically, the job tracker 501 adds the number of splits obtained by the division to the number of splits of the current job ID in S2403.

Subsequently, the job tracker 501 provides information indicating the job ID to the splits (S2404). Information indicating a job ID is a value which is discriminable from a content of a split and is information in which a job ID is written. For example, when a job ID is 1, information indicating the job ID is <1>. Then, the job tracker 501 determines whether or not to have received a tail file of the current job ID (S2405). When the job tracker 501 has received a tail file (S2405: Yes), the job tracker 501 stores the reception of the tail file of the current job ID (S2406). After an end of the execution of S2406, the job tracker 501 ends the file reception processing.

When the job tracker 501 has not received a file from the job client 301 (S2401: No) or has not received a tail file (S2405: No), the job tracker 501 ends the file reception processing. Due to the execution of the file reception processing, the distributed processing system 2100 is capable of providing information indicating a job ID to an inputted split.

FIG. 25 is a flowchart illustrating an example of a map task generation processing procedure according to embodiment 2. In the map task generation processing according to embodiment 2, S2501 to S2503 are same as S1601 to S1603, so that description thereof is omitted.

After completion of execution of S2503, the job scheduler 502 determines whether or not the number of inputted splits agrees with the number of splits of a current job ID (S2504). When the numbers agree with each other (S2504: Yes), the job scheduler 502 subsequently determines whether or not to have received a tail file of the current job ID (S2505). When the job scheduler 502 has received the tail file of the current job ID (S2505: Yes), the job scheduler 502 stores the detection of the tail split (S2506). When the numbers do not agree with each other (S2504: No) or when the job scheduler 502 has not received the tail file of the current job ID (S2505: No), the job scheduler 502 ends the map task generation processing. The processing of S2306 depicted in FIG. 23 may be performed at timing after S2501 and before S2504.

As described above, according to the information processing device according to embodiment 2, when information indicating a job ID is provided in division of a file into splits, further, the number of splits in the division agrees with the number of inputted splits, and a tail file is received, the processing is shifted to shuffle processing. Accordingly, even if an input order of splits is not guaranteed, the distributed processing system 2100 is capable of obtaining a correct processing result.

For example, it is assumed that the number of splits in division is three and splits are inputted in an order of the first split of job ID:1, the second split of job ID:1, the first split of job ID:2, and the third split of job ID:1. At a time point on which the input of the first split of job ID:2 is detected, the information processing device does not allocate map processing because an inputted split does not have a current job ID:1.

Subsequently, at a time point on which input of the third split of job ID:1 is detected, the information processing device allocates map processing because an inputted split has the current job ID:1. After completion of the map processing with respect to the first to third splits of job ID:1, the information processing device executes shuffle and sort processing. Accordingly, the information processing device is capable of obtaining a correct processing result even if inputted splits are mixed with those of the next job.

The information processing device according to embodiment 2 may increment the number of inputted splits when detecting input of a split into a storage unit or may increment when allocating map processing. Consequently, the information processing device is capable of counting the number of inputted splits.

The information processing methods described in embodiments 1 and 2 may be realized by executing a prepared program by a computer such as a personal computer and a work station. The allocation program is stored in a storage medium, which is readable by a computer, such as hard disk, a flexible disk, a CD-ROM, an MO, and a DVD, and is executed by being read from a storage medium by a computer. The allocation program may be distributed via a network such as Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program causing a processor to execute a process, the process comprising:
   for one piece of a plurality of pieces of data included in a series of data sequentially input into a memory,
      detecting that the one piece was input into the memory, the series of data being a processing object of first processing,
      selecting a node from among a plurality of nodes based on the detecting,
      first allocating the first processing, of which a processing object is the one piece, to the selected node, and
      first determining whether or not the one piece is a last piece of data of the series of data, based on information attached to the one piece; and
   second allocating second processing, of which a processing object is processing results of the first processing that is executed to each piece of the plurality of pieces of data, to at least one node from among the plurality of nodes when the one piece is determined to be the last piece of data of the series of data, wherein
   the first processing counts a number of vehicles of each road by using measurement results of an amount of traffic of each road per a certain time unit, and
   the second processing outputs the number as congestion information.

2. The non-transitory computer-readable recording medium according to claim 1, wherein the process further comprises:
   generating identification information inherent to the plurality of pieces of data each of which is a processing object of the first processing, wherein
   the first allocating includes allocating the first processing with the identification information, to the selected node, and
   the second allocating includes
      identifying the processing results of the first processing which is allocated with the identification information, and
      allocating the second processing which is to be processed on the identified processing results of the first processing, to the at least one node from among the plurality of nodes when the one piece is determined to be the last piece of data of the series of data.

3. The non-transitory computer-readable recording medium according to claim 1, wherein
   the processing object of the second processing is one or more processing results that are obtained by summarizing a processing result of the first processing based on an attribute of the processing result of the first processing.

4. The non-transitory computer-readable recording medium according to claim 1, wherein
   the processing object of the first processing is the series of data included in a plurality of files, the series of data including the plurality of pieces of data obtained by dividing the plurality of files, and
   the first determining includes further determining whether or not the one piece is a last piece of data of the series of data, by comparing a number of the plurality of pieces of data included in the series of data and a number of the piece of data that are input into the memory, and
   the second allocating includes allocating the second processing, to the at least one node from among the plurality of nodes when the number of the plurality of pieces of data included in the series of data and the number of the pieces of data that are input into the memory is determined to be equal by the first determining.

5. The non-transitory computer-readable recording medium according to claim 4, wherein the process further comprises:
generating identification information inherent to the plurality of pieces of data each of which is a processing object of the first processing, wherein
the first allocating includes allocating the first processing with the identification information, to the selected node, and
the second allocating includes
identifying the processing results of the first processing which is allocated with the identification information, and allocating the second processing which is to be processed on the identified processing results of the first processing, to the at least one node from among the plurality of nodes when the number of the plurality of pieces of data included in the series of data and the number of the pieces of data that are input into the memory is determined to be equal by the first determining.

6. The non-transitory computer-readable recording medium according to claim 4, wherein the process further comprises:
incrementing the number of the data that are input into the memory, when detecting that the one piece was input into the memory, wherein
the first determining includes further determining whether or not the one piece is a last piece of data of the series of data, by comparing the number of the plurality of pieces of data of the series of data and the incremented number of the pieces of data that are input into the memory.

7. The non-transitory computer-readable recording medium according to claim 4, wherein
the second allocating includes allocating the second processing, of which a processing object is one or more processing results that are obtained by summarizing a processing result of the first processing on the basis of an attribute of the processing result of the first processing, to the at least one node from among the plurality of nodes, when the number of the plurality of pieces of data included in the series of data and the number of the pieces of data that are input into the memory is determined to be equal by the first determining.

8. The non-transitory computer-readable recording medium according to claim 1, wherein
the information is tail information that indicates a tail of the series of data, and
the first determining includes further determining that the one piece is the last piece of data of the series of data when the tail information is determined to be input into the memory with regard to the series of data.

9. The non-transitory computer-readable recording medium according to claim 1, wherein the series of data is sequentially input into the memory from a measurement file transmitted from an external device, and
the information indicates that the one piece is the last piece of data input from the measurement file.

10. An information processing device, comprising:
circuitry configured to:
for one piece of a plurality of pieces of data included in a series of data sequentially input into a memory,
detect that the one piece was input into the memory, the series of data being a processing object of first processing,
select a node from among a plurality of nodes based on the detecting,
allocate the first processing, of which a processing object is the one piece, to the selected node, and
determine whether or not the one piece is a last piece of data of the series of data, based on information attached to the one piece, and
allocate second processing, of which a processing object is processing results of the first processing that is executed to each piece of the plurality of pieces of data, to at least one node from among the plurality of nodes when the one piece is determined to be the last piece of data of the series of data, wherein
the first processing counts a number of vehicles of each road by using measurement results of an amount of traffic of each road per a certain time unit, and
the second processing outputs the number as congestion information.

11. An information processing method that is implemented by an information processing device, the information processing method comprising:
for one piece of a plurality of pieces of data included in a series of data sequentially input into a memory,
detecting that the one piece was input into the memory, the series of data being a processing object of first processing,
selecting a node from among a plurality of nodes based on the detecting;
allocating the first processing, of which a processing object is one piece, to the selected node, and
determining whether or not the one piece is a last piece of data of the series of data, based on information attached to the one piece; and
allocating second processing, of which a processing object is processing results of the first processing that is executed to each piece of the plurality of pieces of data, to at least one node from among the plurality of nodes when the one piece is determined to be the last piece of data of the series of data, wherein
the first processing counts a number of vehicles of each road by using measurement results of an amount of traffic of each road per a certain time unit, and
the second processing outputs the number as congestion information.

* * * * *